(12) United States Patent
Ishikawa et al.

(10) Patent No.: US 9,408,213 B2
(45) Date of Patent: Aug. 2, 2016

(54) WIRELESS COMMUNICATION SYSTEM, FREQUENCY CHANNEL SHARING METHOD, AND NETWORK CONTROLLER DEVICE

(71) Applicant: HITACHI KOKUSAI ELECTRIC INC., Tokyo (JP)

(72) Inventors: Takashi Ishikawa, Tokyo (JP); Shinji Murai, Tokyo (JP); Tsuyoshi Tamaki, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 14/412,082

(22) PCT Filed: Jun. 28, 2013

(86) PCT No.: PCT/JP2013/067794
§ 371 (c)(1),
(2) Date: Dec. 30, 2014

(87) PCT Pub. No.: WO2014/007156
PCT Pub. Date: Jan. 9, 2014

(65) Prior Publication Data
US 2015/0156775 A1    Jun. 4, 2015

(30) Foreign Application Priority Data
Jul. 4, 2012    (JP) .................................. 2012-150820

(51) Int. Cl.
*H04W 72/04* (2009.01)
*H04W 16/14* (2009.01)

(52) U.S. Cl.
CPC .......... *H04W 72/0453* (2013.01); *H04W 16/14* (2013.01)

(58) Field of Classification Search
None
See application file for complete search history.

(56) References Cited

U.S. PATENT DOCUMENTS 6,016,311 A    1/2000    Gilbert et al.
7,548,559 B2 *  6/2009    Aarnio .......................... 370/469
(Continued)

FOREIGN PATENT DOCUMENTS

| JP | 2001-523931 A | 11/2001 |
| JP | 2008-167010 A | 7/2008 |
| JP | 2012-109922 A | 6/2012 |

OTHER PUBLICATIONS

IEEE 802.22TM-2011 Standard Wireless Regional Area Networks "Part 22: Cognitive Wireless RAN Medium Access Control (MAC) and Physical Layer(PHY) specifications: Policies and procedure for operation in the TV Bands", Jul. 1, 2011.

*Primary Examiner* — Chi H Pham
*Assistant Examiner* — Shick Hom
(74) *Attorney, Agent, or Firm* — Volpe and Koenig, P.C.

(57) ABSTRACT

When a frequency channel is shared between adjacent cells in a wireless communication system of time-division duplex operation utilizing a white space, more efficient communications can be achieved. In a wireless communication system of time-division duplex operation utilizing a white space, which is a temporally and spatially unused frequency, to perform wireless communications and having frames in which downstream and upstream subframes are alternately arranged on the time axis, a network controller calculates a common split position, which is to be used in synchronization between base stations sharing a frequency, from collected information in response to a frequency sharing trigger and synchronizes the determined split position between the base stations, thereby allowing the frequency channel to be shared.

16 Claims, 31 Drawing Sheets

(56) References Cited

U.S. PATENT DOCUMENTS

| | | |
|---|---|---|
| 7,804,798 B2 * | 9/2010 | Baiamonte et al. ........... 370/328 |
| 2010/0120358 A1 * | 5/2010 | Wan ............................ 455/11.1 |
| 2010/0254323 A1 * | 10/2010 | Youn et al. ..................... 370/329 |
| 2012/0069806 A1 * | 3/2012 | Norlen et al. .................. 370/329 |
| 2012/0176995 A1 * | 7/2012 | Parkvall et al. ............... 370/329 |
| 2013/0102344 A1 | 4/2013 | Sawai |

* cited by examiner

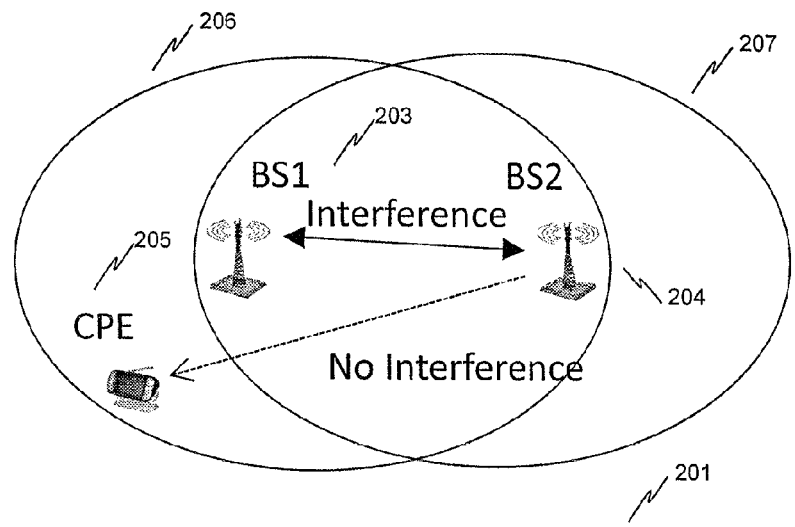
(a) CASE WHERE INTERFERENCE IS GIVEN ONLY BETWEEN BS
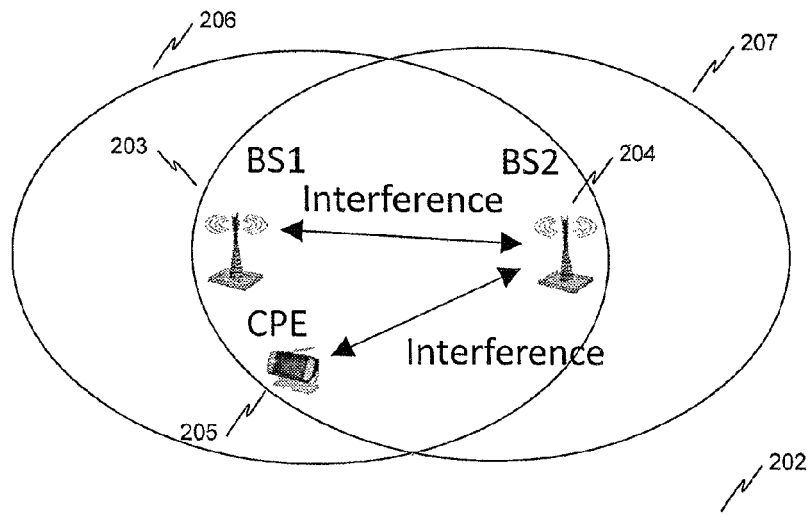
(b) CASE WHERE INTERFERENCE IS ALSO GIVEN TO CPE
FIG. 2

Channel 1
BS1 | f00 | f01 | f02 | f03 | f04 | f05 | f06 | f07 | f08 | f09 | f10 | f11 | f12 | f13 | f14 | f15 |

Channel 2
BS2 | f00 | f01 | f02 | f03 | f04 | f05 | f06 | f07 | f08 | f09 | f10 | f11 | f12 | f13 | f14 | f15 |

Channel 3
BS3 | f00 | f01 | f02 | f03 | f04 | f05 | f06 | f07 | f08 | f09 | f10 | f11 | f12 | f13 | f14 | f15 |

(a) Normal Mode  301

Channel 1
BS1 | f00 | f01 | f02 | f03 | f04 | f05 | f06 | f07 | f08 | f09 | f10 | f11 | f12 | f13 | f14 | f15 |

Channel 1
BS2 | f00 | f01 | f02 | f03 | f04 | f05 | f06 | f07 | f08 | f09 | f10 | f11 | f12 | f13 | f14 | f15 |

Channel 1
BS3 | f00 | f01 | f02 | f03 | f04 | f05 | f06 | f07 | f08 | f09 | f10 | f11 | f12 | f13 | f14 | f15 |

(b) ODFC Mode  302

FIG. 3

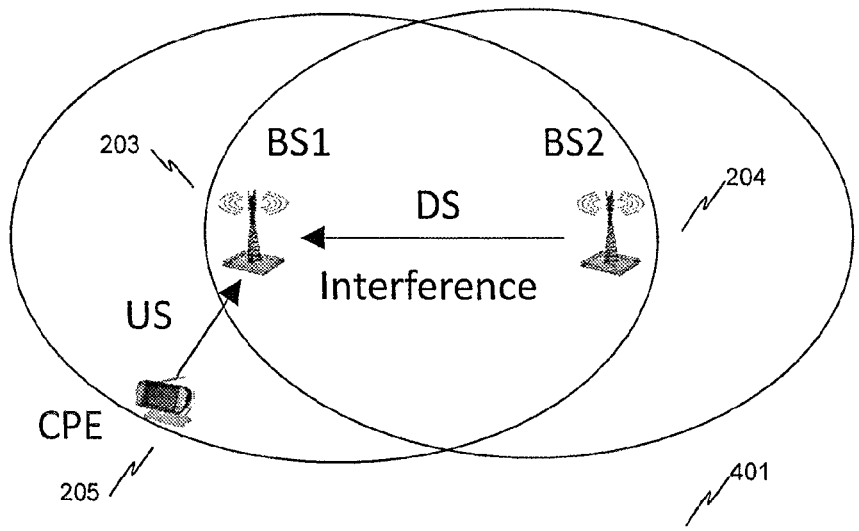
(a) STATE IN WHICH INTERFERENCE IS GIVEN
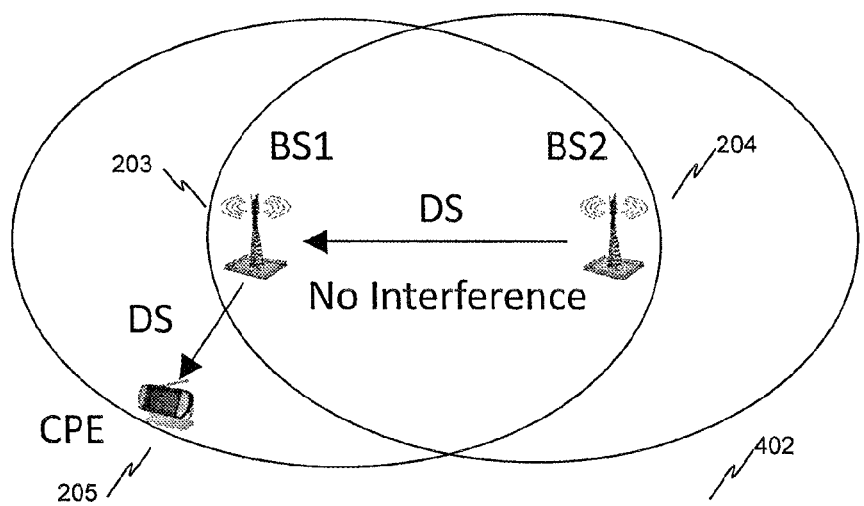
(b) STATE IN WHICH INTERFERENCE IS NOT GIVEN
FIG. 4

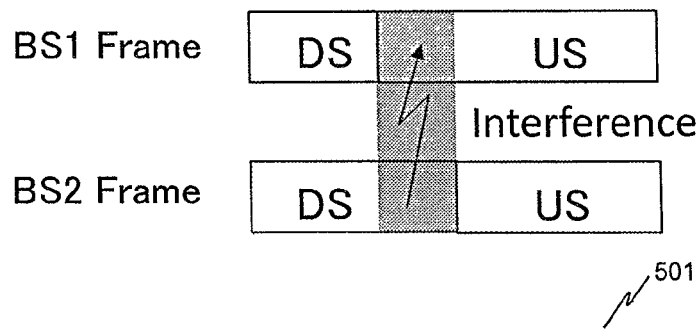
(a) STATE IN WHICH INTERFERENCE IS GIVEN
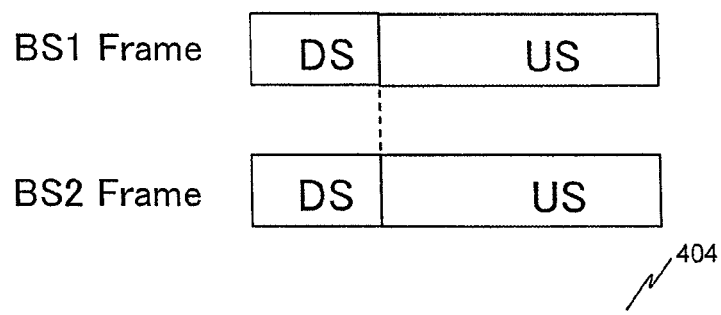
(b) STATE IN WHICH INTERFERENCE IS NOT GIVEN
FIG. 5

1101

| ITEM | UNIT | SUMMARY OF VALUE |
|---|---|---|
| BS ID | - | ID NUMBER OF BS |
| USE CHANNEL (CHANNEL DESIRED TO BE SHARED) | - | CHANNEL NUMBER |
| PRESENCE OR ABSENCE OF CPE INTERFERENCE | - | PRESENCE OR ABSENCE OF INTERFERENCE FROM CPE BELONGING TO ANOTHER BS |
| SHARING STATE | - | NO SHARING/DESIRED TO BE SHARED ODFC/DUSA |
| PRESENT SPLIT POSITION | bit | NUMBER OF BITS FROM FRAME START US START |
| REQUESTED SPLIT POSITION | bit | NUMBER OF BITS FROM FRAME START US START |
| DUSA SPLIT POSITION | bit | COMMON SPLIT POSITION DETERMINED IN DUSA |
| PRESENT FRAME NUMBER | - | NUMBER OF CURRENTLY ALLOCATED FRAMES |
| REQUESTED FRAME NUMBER | - | NUMBER OF REQUESTED FRAMES |
| ODFC FRAME NUMBER | - | NUMBER OF FRAMES DETERMINED IN ODFC |

FIG. 11

| ITEM NUMBER | ITEM | CHANNEL NUMBER |
|---|---|---|
| 0 | USE CHANNEL SET | 1 |
| 1 | BACKUP CHANNEL SET | 2 |
| 2 | CANDIDATE CHANNEL SET | 7 |
| 3 | CORRESPONDING CELL PRIORITY SET1 | 2 |
| 4 | CORRESPONDING CELL PRIORITY SET2 | 2,7 |
| 5 | CORRESPONDING CELL PRIORITY SET3 | 3,4,5,6,8 |
| - | ADJACENT USE CHANNEL SET | 2,3,5,6,8 |
| - | ADJACENT BACKUP CHANNEL SET | 4,5,6,7,8 |

FIG. 12

| BS NAME | BS ID | USE Ch | PRESENCE OR ABSENCE OF CPE INTERFERENCE | PRESENT SPLIT POSITION (bit) | REQUESTED SPLIT POSITION (bit) | SHARING STATE | SELECTION METHOD (POLICY) | DUSA DETERMINATION SPLIT POSITION (bit) |
|---|---|---|---|---|---|---|---|---|
| BS1 | 1 | 1 | 0 | 120 | 120 | no | 1 | - |
| BS2 | 2 | 5 | 1 | 150 | 150 | ODFC | 1 | - |
| BS3 | 3 | 3 | 0 | 200 | 200 | DUSA | 1 | 200 |
| BS4 | 4 | 3 | 0 | 200 | 100 | DUSA | 1 | 200 |
| BS5 | 5 | 3 | 0 | 200 | 180 | DUSA | 1 | 200 |

FIG. 17

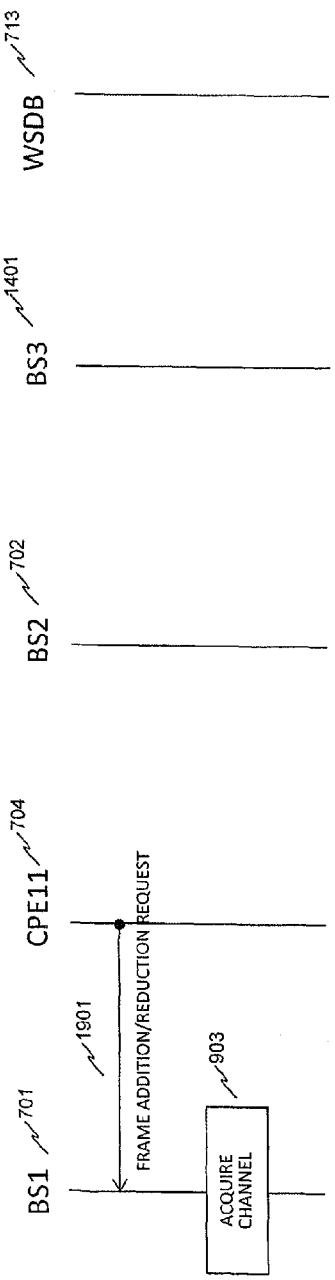
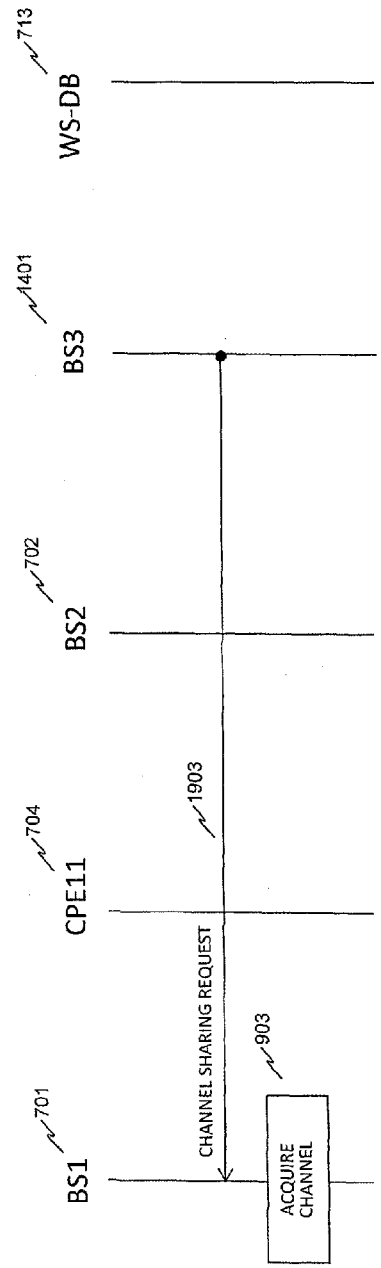
FIG. 19

| POLICY | SPLIT POSITION SELECTION METHOD |
|---|---|
| 0 | MEAN VALUE IN SHARING CELLS |
| 1 | SPLIT POSITION WITH MAXIMUM DS |
| 2 | SPLIT POSITION WITH MAXIMUM US |
| 3 | PREDEFINED SPLIT POSITION |
| 4 | SPLIT POSITION WITH HIGHEST CHANNEL USE EFFICIENCY AMONG 0 TO 4 |

FIG. 21

WIRELESS COMMUNICATION SYSTEM, FREQUENCY CHANNEL SHARING METHOD, AND NETWORK CONTROLLER DEVICE

TECHNICAL FIELD

The present invention relates to a wireless communication system, a frequency channel sharing method, and a network controller device, and relates to a communication control technique in which communication is performed so as not to give interference to each other even if a plurality of base stations share a single frequency channel in a wireless communication system using a white space.

BACKGROUND ART

Currently, radio waves are widely used in various fields, and, particularly, great needs for a wireless broadband system which can be used regardless of places or time are expected in the future. In order to satisfy these needs, a new frequency is required to be secured, but frequency bands of 6 GHz or lower which are convenient to be used in a wireless broadband have already been used in a scrupulous manner. For this reason, in the future, even in a frequency which has already been allocated, a frequency band (a so-called white space) which can be used temporally, spatially, and technically is required to be flexibly used after sufficiently avoiding interference with an existing system.

Following this trend, research and development or standardization of a wireless communication system using a white space have progressed in countries all over the world. In Japan, the Ministry of Internal Affairs and Communications has made specific examination of institutional, technical issues or the like for directivity of the use of new radio waves or realization methods thereof, in "Study Group on the Use of New Radio Waves". The report collected in July, 2010 proposed that "research and development should be promoted for developing technique which enables a plurality of frequency bands to be dynamically used and establishes prevention of interference with an existing system or the like, such as a spectrum sensing technique or a dynamic access technique, and effective use of radio waves should be required", and twenty-five white space special districts were selected in April, 2011 in order to promote systemization and business development of services or systems using the white space, and research and development or demonstration tests thereof have progressed. On the other hand, outside Japan, in U.S.A, a commission for recognizing the use of a white space was adopted in November, 2008, and the Federal Communications Commission (FCC) has performed work including establishment of specific technical criteria or building of databases. As mentioned above, many countries are also performing research and development regarding a new wireless technique aiming at the use of a white space. In addition, standardization organizations such as IEEE SCC41, IEEE802.22, and IEEE802.19 are making frantic efforts to standardize a technique which highly uses a white space.

As described above, the white space has attracted much attention, and, above all, IEEE802.22 as a standardization specification of a wireless regional area network (WRAN) which realizes a wireless broadband by using a TV band frequency is considerably expected (NPL 1). In the TV band, channels are disposed with a margin for each region in order to prevent interference between channels, and thus there are many frequency channels (white spaces) which are not actually used. In addition, there is the time at which even an allocated frequency channel is not actually used due to termination of broadcasting in the middle of the night. Since unused frequency channels or unused time zones are predefined, this information is stored in a database for each place, and thus it is possible to relatively easily prevent interference with an existing system.

In order to avoid interference with the TV band frequency, an IEEE802.22 system has not only a database function which is the above-described database, but also functions such as a geolocation function, a spectrum sensing function, a spectrum manager function, and a self-coexistence function.

The spectrum manager function is implemented in a base station, and realizes determination of a frequency channel to be used according to a channel allocation algorithm called an etiquette mode so that frequency channels do not overlap each other between adjacent cells, that is, interfere with each other, on the basis of base station position information, frequency information obtained by the database function, policy, or the like. In addition, in this function, in a case where the use of an existing system such as terrestrial digital broadcasting in a base station or a terminal is detected by the spectrum sensing function, a structure (incumbent detection recovery protocol: IDRP) is provided in which transfer to another backup channel which is predefined. In the spectrum manager function, control is performed so that frequency channels do not overlap each other between adjacent cells as much as possible, but, in a case where the number of frequency channels is not sufficient, and a frequency channel has to be shared between base stations installed at a distance of giving interference to each other, the self-coexistence function is used. The self-coexistence function is a function which is necessary to share the same frequency channel without giving interference to each other even between adjacent cells in the IEEE802.22 system.

FIG. 1 is a flowchart illustrating the self-coexistence function of the 802.22 system.

If a base station (BS) is powered on (101), the BS acquires adjacent cell information such as a used frequency channel (102). The BS tries to acquire a used channel according to the etiquette mode (103 and 104), and if there is a usable channel, communication is performed in a normal mode by using the channel (105). If there is no usable channel, the BS enters a self-coexistence mode, and also uses a channel which is used in an adjacent cell. In the self-coexistence mode, cases are sorted according to whether interference occurring when a frequency is used along with the adjacent cell is given only between base stations or is also given to a CPE (terminal) belonging to an adjacent BS (107).

FIG. 2 illustrates a summary of the case sorting in the self-coexistence mode. An aspect of the above-described case sorting is illustrated in FIG. 2. In FIG. 2, ellipses 206 and 207) respectively indicate ranges in which a BS1 (203) and a BS2 (204) give interference. The BS1 (203) and the BS2 (204) are installed at positions where interference is given. As indicated by (202) of FIG. 2(b), if interference is given not only between the BSs but also to the CPE, the flow proceeds to on-demand frame contention (ODFC) (108), and, as indicated by (201) of FIG. 2(a), if interference is given only between the BSs, the flow proceeds to DS/US split adjustment (DUSA) (111).

Next, a description will be made of the OFDC and DUSA.

FIG. 3 illustrates a frame configuration of the 802.22 system. In the figure, a solid line indicates an allocated frequency channel. In addition, a transverse axis indicates time. FIG. 3 illustrates a situation of a normal mode (301) in which frequency channels (Channel1 to Channel3) are exclusively allocated to three adjacent BSs (BS1 to BS3), and the ODFC (302) in which a single frequency channel (Channel1) is shared therebetween. In the normal mode, all sixteen frames included in a super frame can be used in a frequency channel given to each base station (301), but, in the ODFC, sixteen frames of the shared Channel1 are shared by the respective BSs, and are used so that communication time does not overlap (302, 109). NPL 1 is referred to regarding details of a frame contention method between respective base stations or a frequency allocation method in the etiquette mode in the ODFC.

On the other hand, in the DUSA, not control is performed so that communication time does not overlap, but a split position of a downstream (DS) and an upstream (US) is used in common between a plurality of base stations sharing a frequency channel, and thus the base stations do not give interference to each other.

FIG. 4 is a schematic diagram of the DUSA, and FIG. 5 illustrates a frame configuration example in this case. In FIG. 4, ellipses (204, 205) indicate ranges in which each BS gives interference. It is assumed that a BS1 (203) and a BS2 (204) are installed at positions where interference is given, and a CPE (205) performs communication with the BS1 (203) but is located at a position where interference is not given from the BS2 (204). In the IEEE802.22 system, as illustrated in FIG. 5, a single frame is formed by a downstream (DS) subframe and an upstream (US) subframe. In the normal mode, a split position (a position where a ratio of the DS and the US is determined) of the DS and the US is independently determined for each cell according to a request from a base station or a terminal in each cell. (401) of FIG. 4(a) indicates a state in which interference is given due to transmission (DS) from the BS2 (204) when the CPE (205) performs transmission (US) toward the BS1 (203). As in an example illustrated in FIG. 5(a) (501), in a frame configuration in this case, DS amounts and US amounts are different in the respective BSs, that is, split positions of DS/US are different from each other, and the DS of the BS2 (204) having a larger DS amount given interference to the US of the BS1 (203). On the other hand, FIG. 4(b) (401) illustrates a state in which the CPE (205) does not receive interference from the BS2 (204) even if the BS2 (204) performs transmission (DS) when the BS1 (203) performs transmission (DS) toward the CPE (205) (this is because it is assumed that the CPE (205) is located at a position where interference from the BS2 (204) is not given thereto). As illustrated in FIG. 5(b) (502), if split positions of DS/US are the same in the respective BSs, there is no interference unlike FIG. 5(a) (501). In other words, if the split positions of DS/US of the respective BSs are used in common, even when frames are simultaneously used between adjacent cells, a frequency channel can be shared without giving interference. In the DUSA of IEEE802.22, all cells sharing a frequency are synchronized with a split position where a DS ratio is highest, and thus a frequency channel is shared without mutual interference. PTL 1 discloses a method of minimizing interference which is given to the US of the CPE (205) belonging to the BS1 (203) illustrated in FIGS. 4(a) and 5(a) by the DS from the BS2 (204) sharing a frequency.

In a case where there is a request for frequency sharing from a new BS (106), channel allocation is performed again in the etiquette mode after including the new BS (103). In addition, in a case where there is a new request from the internal BS or CPE during the ODFC mode (110), the flow returns again to the channel allocation (103) in the etiquette mode.

CITATION LIST

Patent Literature

[PTL 1] JP-A-2008-167010

Non Patent Literature

[NPTL 1] IEEE 802.22TM-2011 Standard Wireless Regional Area Networks Part 22: Cognitive Wireless RAN Medium Access Control (MAC) and Physical Layer (PHY) specifications: Policies and procedure for operation in the TV Bands.

SUMMARY OF INVENTION

Technical Problem

PTL 1 discloses a method of minimizing interference which is given to a US of a terminal belonging to a certain BS1 by a DS from a BS2 sharing a frequency. In the DS, slots are allocated to a plurality of CPEs belonging to the BS1, but if a leading slot of the US is allocated to a CPE close to the BS1, there is a possibility that interference may be given by the DS from the BS2 which comes later in a case where a propagation delay time of the DS from the BS2 is large. Therefore, in PTL 1, the slots are allocated from the leading slot in an order of CPEs which are farther from the BS1, and thus interference from the DS is minimized. However, PTL 1 is on the premise that DSs and USs are synchronized in the respective cells, that is, split positions of DS/US are the same as each other, and thus a method of adjusting split positions of DS/US of a plurality of cells is not disclosed.

In addition, in the above NPL 1, when split positions of DS/US are synchronized with each other, all cells sharing a frequency channel are synchronized at a split position where a DS ratio is highest. In this method, there is a possibility that frequency use efficiency may decrease as the number of cells sharing a frequency increases.

In addition, FIG. 6 is a schematic diagram related to a first problem. As illustrated, if there is a cell having a considerably high DS ratio among cells sharing a frequency channel, there is a case where an amount of data which is originally to be received in a US by a BS and should be received in the next and subsequent frames increases, and thus frequency use efficiency is extremely reduced. This problem is a first problem.

Further, in IEEE802.22, signals are transmitted and received by using a coexistence beacon protocol (CBP), and thus spectrum etiquette, ODFC, and DUSA are realized. However, in this method, successive control is performed in which a CPE having received control information of a BS transmits a signal, and the BS or the CPE receiving the signal transmits the signal again. Therefore, as the number of cells sharing a frequency channel increases, time is taken to deliver the control information and thus to deliver a common split position to be shared, and, as a result, there is a possibility that interference due to a deviation of the split position is given for a long period of time. This problem is a second problem.

The present invention has been made in consideration of the above-described problems, and an object thereof is to use a frequency channel with high efficiency by setting a split position of an upstream frame and a downstream frame to an optimum common split position when a frequency channel is shared between adjacent cells in a wireless communication system of time division duplex using a white space.

Solution to Problem

According to the first solving means of the present invention, there is provided a wireless communication system comprising:

one or a plurality of base stations (BSs) that perform a data service in a normal mode in which a channel is not shared between adjacent cells, or in a first sharing mode in which a split position of a downstream subframe and an upstream subframe of each frame in which a frequency channel is shared is used in common, and the downstream subframe and the upstream subframe are alternately disposed on a time axis so that the base stations do not give interference to each other; and a network controller (NC), wherein the NC includes a channel sharing information table that stores channel sharing information including BS identification information, a use channel, the present split position, a requested split position, and a common split position, in relation to the one or the plurality of BSs under the competence of the NC; and a processing unit that determines a common split position of the frame, wherein the BS transmits a base station information including BS identification information, a use channel, the present split position, and a requested split position, the NC receives the base station information and stores the base station information in the channel sharing information table, when the BS acquires a usable channel, in a case where the BS determines that channel acquisition fails due to a channel shared by an adjacent cell being selected, the BS determines whether or not a wireless terminal belonging to another BS adjacent thereto is located at a position where interference is given to the BS, and in a case where there is no interference from the wireless terminal, the BS transmits a channel sharing start trigger including BS identification information and a use channel to the NC, the NC receives the channel sharing start trigger from the BS, and the processing unit determines a common split position candidate at which first estimated channel use efficiency is the maximum as common split position information and sends the common split position information to the BS, and the BS receives the common split position information determined by the NC, adjusts a split position according to the common split position information, and performs a data service by using channel sharing based on a first sharing mode.

According to the second solving means of the present invention, there is provided a frequency channel sharing method in a wireless communication system, the wireless communication system comprising:

one or a plurality of base stations (BSs) that perform a data service in a normal mode in which a channel is not shared between adjacent cells, or in a first sharing mode in which a split position of a downstream subframe and an upstream subframe of each frame in which a frequency channel is shared is used in common, and the downstream subframe and the upstream subframe are alternately disposed on a time axis so that the base stations do not give interference to each other; and a network controller (NC), wherein the NC includes a channel sharing information table that stores channel sharing information including BS identification information, a use channel, the present split position, a requested split position, and a common split position, in relation to the one or the plurality of BSs under the competence of the NC; and a processing unit that determines a common split position of the frame, wherein the BS transmits a base station information including BS identification information, a use channel, the present split position, and a requested split position, the NC receives the base station information and stores the base station information in the channel sharing information table, when the BS acquires a usable channel, in a case where the BS determines that channel acquisition fails due to a channel shared by an adjacent cell being selected, the BS determines whether or not a wireless terminal belonging to another BS adjacent thereto is located at a position where interference is given to the BS, and in a case where there is no interference from the wireless terminal, the BS transmits a channel sharing start trigger including BS identification information and a use channel to the NC, the NC receives the channel sharing start trigger from the BS, and the processing unit determines a common split position candidate at which first estimated channel use efficiency is the maximum as common split position information and sends the common split position information to the BS, and the BS receives the common split position information determined by the NC, adjusts a split position according to the common split position information, and performs a data service by using channel sharing based on a first sharing mode.

According to the third solving means of the present invention, there is provided a network controller device in a wireless communication system, the wireless communication system comprising:

one or a plurality of base stations (BSs) that perform a data service in a normal mode in which a channel is not shared between adjacent cells, or in a first sharing mode in which a split position of a downstream subframe and an upstream subframe of each frame in which a frequency channel is shared is used in common, and the downstream subframe and the upstream subframe are alternately disposed on a time axis so that the base stations do not give interference to each other; and the network controller device (NC), wherein the NC includes a channel sharing information table that stores channel sharing information including BS identification information, a use channel, the present split position, a requested split position, and a common split position, in relation to the one or the plurality of BSs under the competence of the NC; and a processing unit that determines a common split position of the frame, wherein the NC, from the BS, receives a base station information including BS identification information, a use channel, the present split position, and a requested split position, the NC stores the base station information in the channel sharing information table, when the BS acquires a usable channel, in a case where the BS determines that channel acquisition fails due to a channel shared by an adjacent cell being selected, the BS determines whether or not a wireless terminal belonging to another BS adjacent thereto is located at a position where interference is given to the BS, and in a case where there is no interference from the wireless terminal, the NC, from the BS, receives a channel sharing start trigger including BS identification information and a use channel, the processing unit determines a common split position candidate at which first estimated channel use efficiency is the maximum as common split position information and sends the common split position information to the BS, and the NC makes the BS receive the common split position information determined by the NC, adjust a split position according to the common split position information, and perform a data service by using channel sharing based on a first sharing mode.

Advantageous Effects of Invention

According to the present invention, it is possible to use a frequency channel with high efficiency by setting a split position of an upstream frame and a downstream frame to an optimum common split position when a frequency channel is shared between adjacent cells in a wireless communication system of time division duplex using a white space.

BRIEF DESCRIPTION OF DRAWINGS

FIG. 2 is a diagram illustrating a summary of casing sorting in the self-coexistence mode.
FIG. 3 is a configuration diagram illustrating a super frame in ODFC.
FIG. 4 is a schematic diagram illustrating DUSA.
FIG. 5 is a frame configuration diagram illustrating the DUSA.
FIG. 11 is a diagram illustrating a BS information table.
FIG. 12 is a diagram illustrating a channel set information table.
FIG. 17 is a diagram illustrating a channel sharing information table.
FIG. 19 is a diagram illustrating a sharing request reception sequence.
FIG. 21 is a diagram illustrating a DUSA selection method determination table.

DESCRIPTION OF EMBODIMENTS

A. Summary

Figure 1:
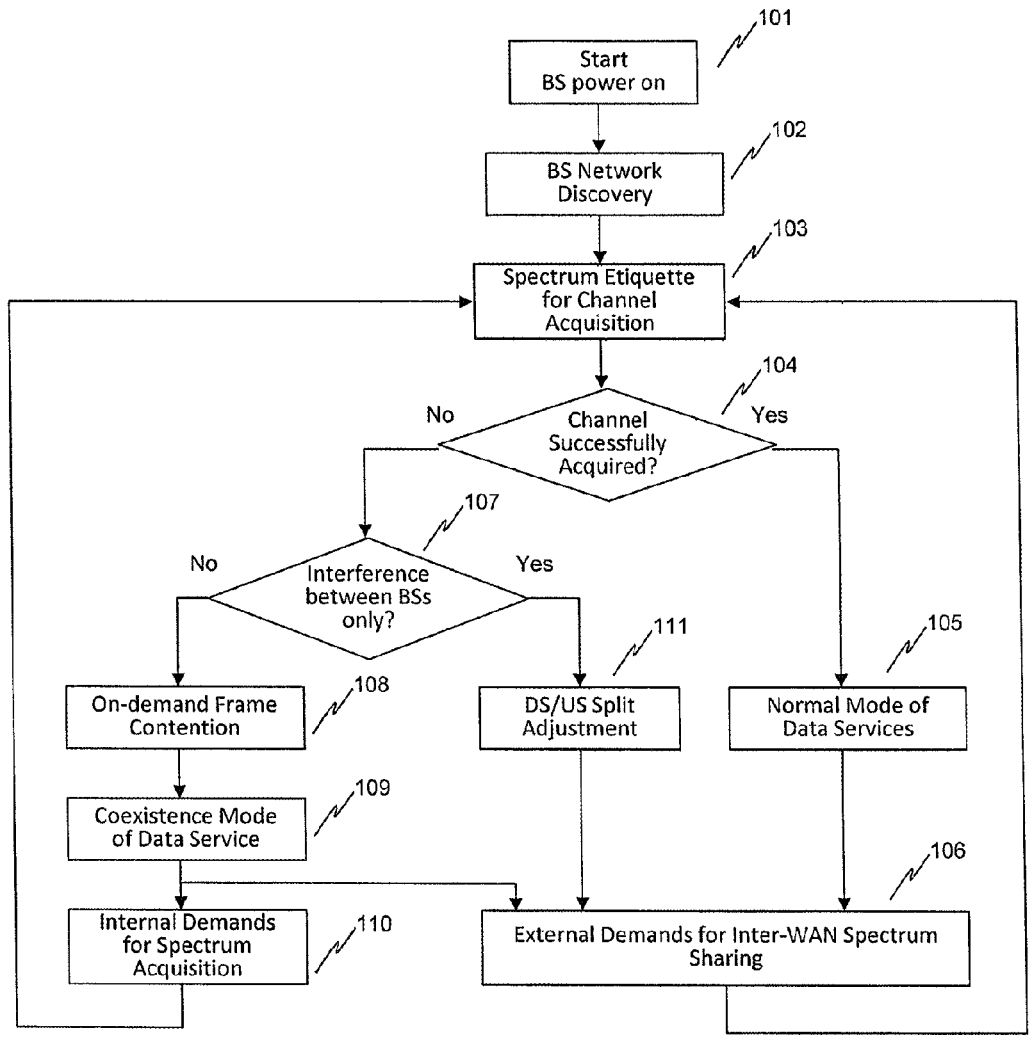
FIG. 1 is a flowchart illustrating a self-coexistence mode.
Figure 6:
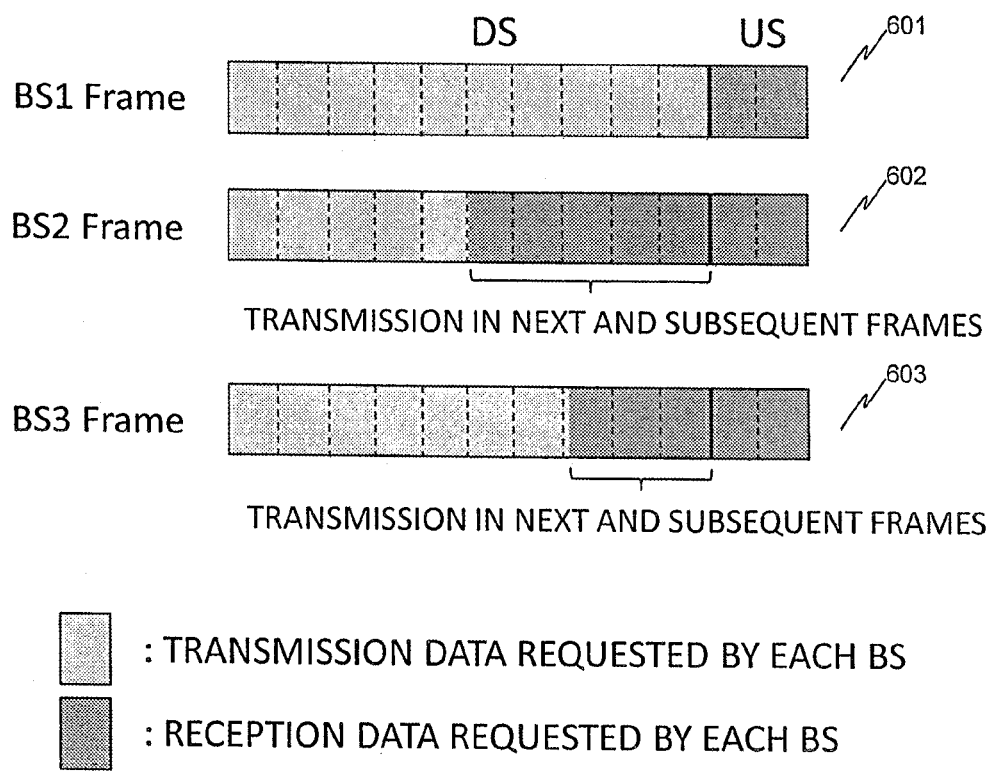
FIG. 6 is a schematic diagram illustrating a first problem.

Hereinafter, representative Examples of the present examples will be described with reference to the drawings. In first Example, a description will be made of an example in which, in a case where there is no interference from a terminal which does not belong to a certain base station, an optimum common split position is calculated in the base station, and a frequency channel is shared in a first sharing method. In second Example, a description will be made an example in which, in a case where there is no interference from a terminal which does not belong to a certain base station, estimated channel use efficiency of the first sharing method and that of a second sharing method are compared with each other, and channel sharing is performed in a sharing method having higher channel use efficiency.

In order to solve the above-described first problem and second problem, in the present Example, there is provided a wireless communication system which performs wireless communication by using a white space as a frequency which is temporally and spatially blank, and has a frame in which a downstream subframe and an upstream subframe are alternately disposed on a time axis, the wireless communication system including:

a plurality of cells each of which includes abase station which can determine a frequency channel to be used, and a plurality of terminals which performs wireless communication by using a frequency channel designated from the base station;

a database that provides frequency information to the base station; and a network controller that receives control information pieces unique to base stations from the plurality of base stations, determines optimum control information on the basis of the plurality of received control information pieces unique to the base stations, and transmits the determined optimum control information to the plurality of base stations.

The network controller includes means for collecting split position information of an upstream subframe and a downstream subframe used in a cell to which the base station belongs from the plurality of base stations;

the base station is located at a place where the base station and a base station adjacent to the base station give interference to each other, and includes means for transmitting a frequency channel sharing start trigger to the network controller in a case where a frequency channel other than frequency channels used in all base stations adjacent to the base station cannot be independently used when the base station does not receive interference from a terminal which performs communication with a base station located near the base station; and the network controller includes means for calculating a common split position which is used through synchronization between the plurality of base stations on the basis of the collected information when the trigger is received, and starts sharing of a frequency channel in a first sharing method in which the frequency channel is shared by using the calculated optical system.

In addition, the wireless communication system further includes means for comparing frequency channel use efficiency in a case where a frequency channel is shared in the first sharing method with frequency channel use efficiency in a case where a frequency channel is shared in a second sharing method in which a frame is divided between the plurality of base stations in a time division manner, and a frequency channel starts being shared by using a sharing method having the higher frequency channel use efficiency.

[First Example]

B. First Embodiment

1. System

Figure 7:
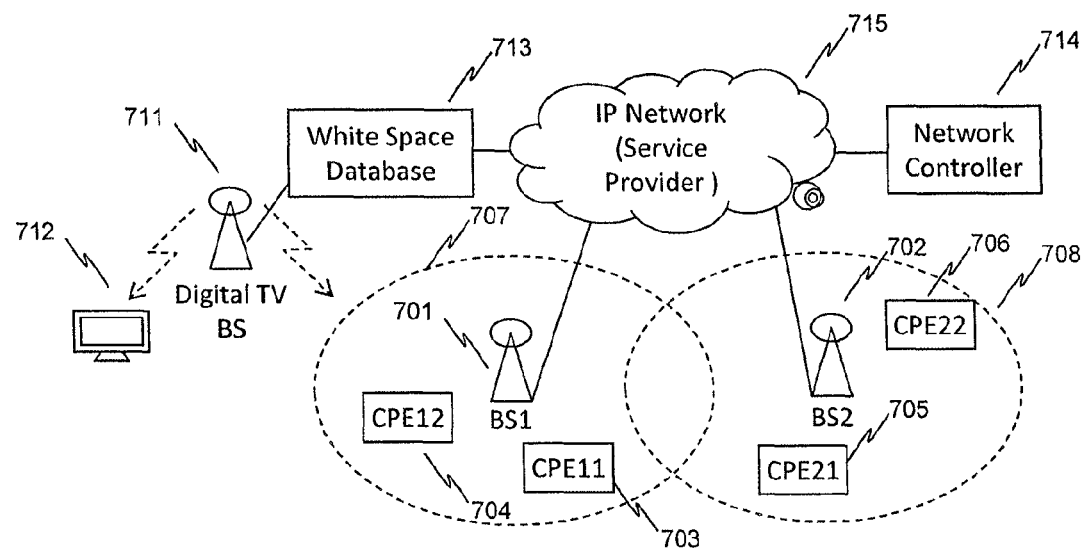
FIG. 7 is a WARN system configuration diagram.

FIG. 7 illustrates an example of a configuration example of a WRAN network which uses a white space of first Example. In the present example, a description will be described by exemplifying the above-described IEEE802.22 system, but the present example is applicable to a wireless communication system which uses a white space, employs a time division duplex method, and has a frame in which a downstream subframe and an upstream subframe are alternately disposed on a time axis.

This WRAN system includes a plurality of base stations BS (BS1 (701) and BS2 (702)), one or more terminals CPE (703 to 708) belonging to the base stations, a white space database (WSDB) (713), a network controller (NC) (714), and an IP network (715). The number of each of the WSDB (713) and the NC (714) may be one, and the WSDB (713) and the NC (714) may have configurations in which a plurality of objects are placed in the units of regions. This system is characterized in that the NC (714) collects frequency channel use circumstances of a cell belonging to the WRAN and performs centralized control so as to realize frequency channel sharing which does not cause interference even between adjacent cells on the premise that information on a frequency channel which can be used by a corresponding base station is acquired from the WSDB (713) and thus communication is performed between the BS and the CPE so as not to give interference to broadcasting between a television broadcasting station (711) which is an existing system and a television receiver (712).

Figure 8:
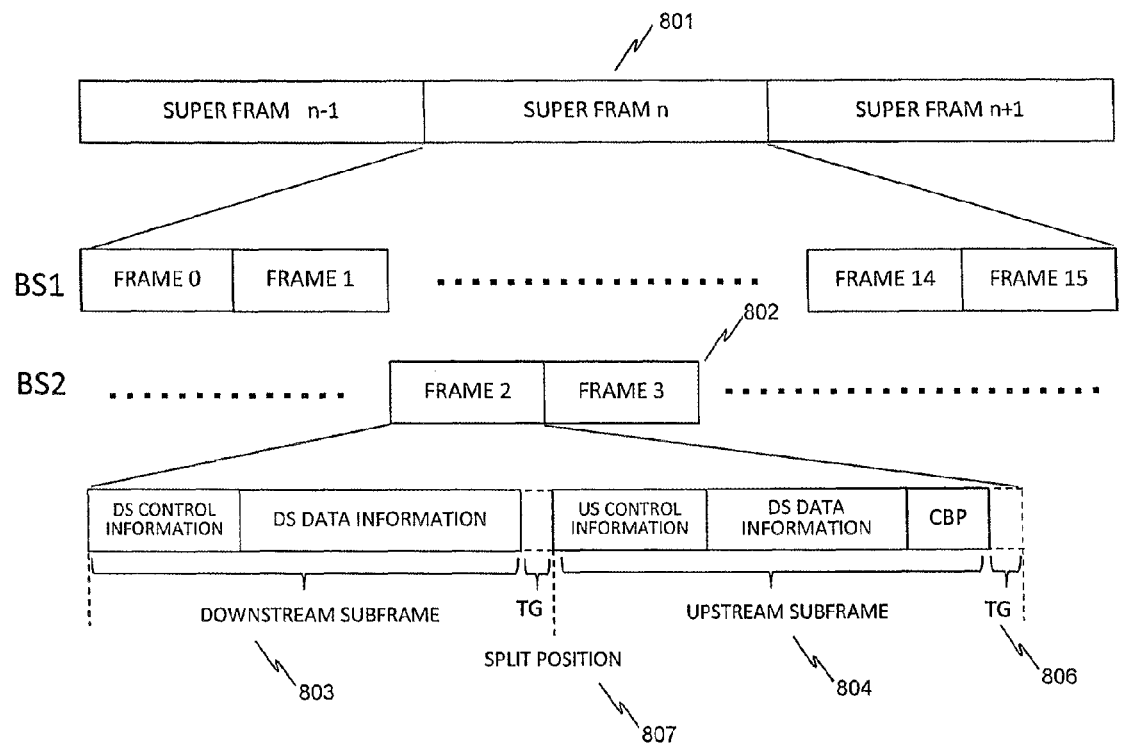
FIG. 8 is a diagram illustrating a frame configuration example (between a BS and a CPE).

FIG. 8 illustrates a wireless frame configuration example of the 802.22 system, used for communication between the BS and the CPE of this system. In the 802.22 system, control is performed in the units of super frames (801) each including sixteen frames (802). Each frame is formed by an upstream subframe and a downstream subframe, in which the downstream subframe (803) and the upstream subframe (804) are alternately disposed on the time axis. Transition gaps (TG) (805, 806) are provided between the downstream subframe and the upstream subframe, and thus it is possible to minimize interference which occurs due to a propagation delay time difference of the upstream subframe (803) and the downstream subframe (804). A boundary between the upstream subframe (803) and the upstream subframe (804) is defined as a split position (807). The split position can be freely changed depending on a request amount of upstream data and downstream data in a cell in a case where the cell allocated to a corresponding frame uses a frequency channel alone (normal mode), but may not be freely changed in a case where the cell shares the frequency channel with an adjacent cell. In addition, in this configuration example, a frame configuration of the 802.22 system has been described, but a frame configuration of time division duplex in which an upstream frame and a downstream frame are alternately disposed on the time axis may be employed.

2. Operation 2-1. Normal Mode

Next, a description will be made of an operation sequence of this system. As described above, this system is characterized in that frequency channel sharing control is performed so that interference does not occur even between adjacent cells, but, first, a description will be made of an operation sequence in a normal mode in which a channel is not shared between the adjacent cells.

Figure 9:
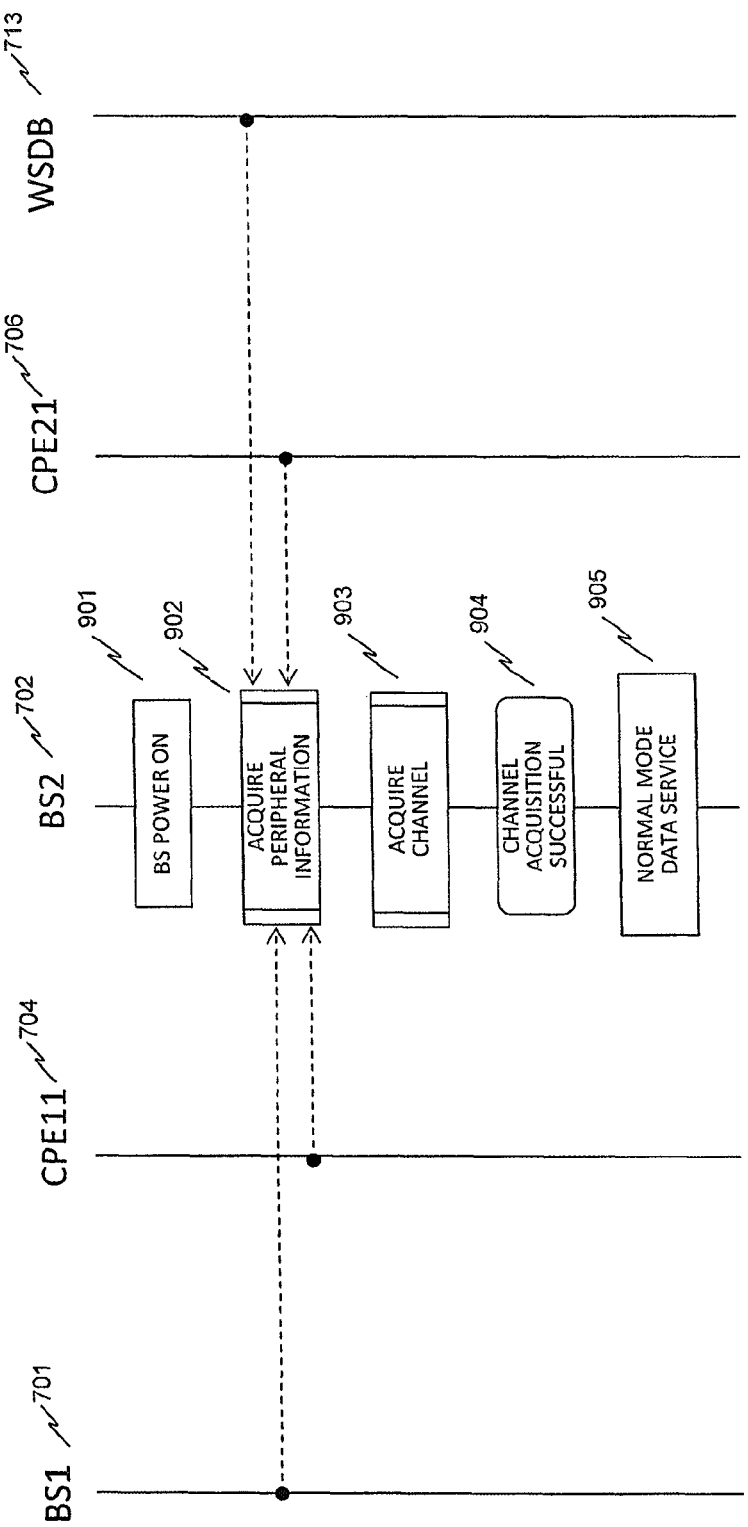
FIG. 9 is a diagram illustrating an operation sequence in a normal mode.

FIG. 9 illustrates an operation sequence in the normal mode. In addition, in this sequence, a description will be made of a case where the BS2 (702) is newly activated and performs data communication with the BS1 (701) by using a different frequency channel in a state in which the BS1 (701) has been activated. If the BS2 (702) is powered on (901), first, the BS2 (702) acquires peripheral information (902).

Figure 10:
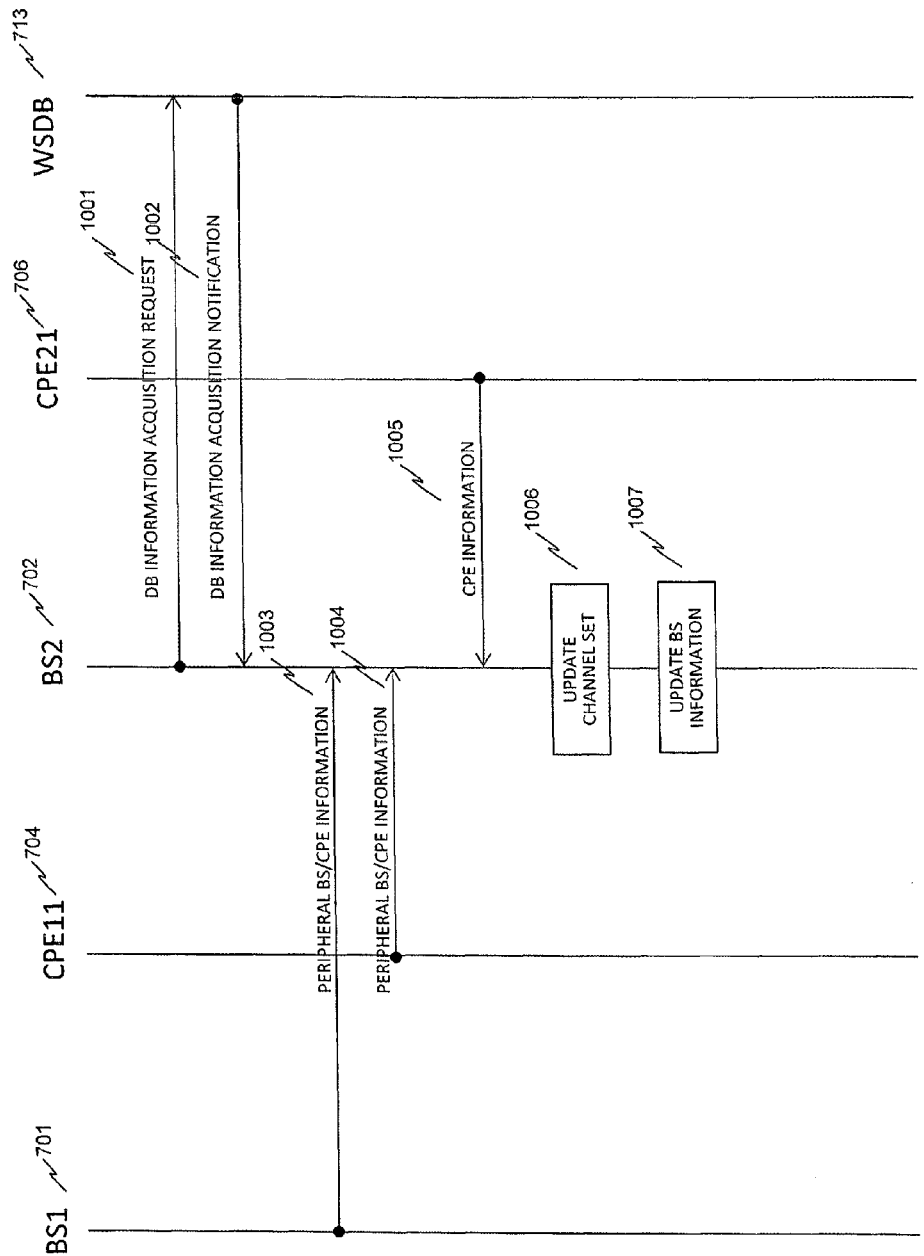
FIG. 10 is a diagram illustrating a peripheral information acquisition sequence.

FIG. 10 illustrates a peripheral information acquisition sequence. The BS2 (702) transmits a DB information acquisition request to the WSDB (713) in order to acquire a list of channels which can be used by the base station (1001). The DB information acquisition request (1001) includes a BS ID of the BS2 (702), an installation position (latitude and longitude information) of the BS, BS antenna information, and the like. A usable frequency channel list is described in the WSDB (713) for each place or for each base station. This information may be calculated by acquiring information of a transmission station from the transmission station of an existing system such as terrestrial digital broadcasting, and information for each place may be manually input. This WSDB (713) acquires a BS ID from the DB information acquisition request (1001), and returns a usable frequency channel list in the corresponding BS through a DB information acquisition notification (1002). In a case where a base station position or antenna information is included in the DB information acquisition request (1001), the WSDB (713) may calculate a set of frequency channels which can be used at the base station position, and may transmit (1002) the DB information acquisition notification. In addition, this DB information acquisition request (1001) may be transmitted from the BS not only during activation of the BS but also periodically, and thus usable frequency channel information of the BS may be updated at any time. Further, the DB information acquisition notification (1002) is sent at any time from the WSDB (713) side to a BS in which usable frequency information of the BS is changed due to the new use of a frequency channel in an existing system. The BS acquires not only information from the WSDB (713) but also frequency use circumstances in an adjacent cell by sensing radio waves from the adjacent cell for a specific time. In a case of the 802.22 system, a super frame control header (SCH) of an adjacent BS or a coexistence beacon protocol (CBP) of a CPE belonging to the adjacent BS is monitored, and information regarding a channel or a backup channel of an adjacent cell, or information required to share a frequency channel is acquired from control information described in the SCH.

In addition, FIG. 11 illustrates a BS information table. The BS manages information of the BS in the BS information table (FIG. 11). In FIG. 11, a sharing state indicates a sharing method example (ODFC or DUSA) in a case where sharing is currently performed, and a desired sharing state in a case where sharing is desired to be performed from now on. As a use channel, a currently used channel number or a frequency channel number which is obtained through channel acquisition which will be described later is recorded. As the presence or absence of CPE interference, the presence is described in a case where there is interference from a CPE belonging to other BSs. In the 802.22 system, the interference is determined on the basis of the presence or absence of a CBP signal which is transmitted from a CPE of an adjacent cell. As the present split position, a split position used in a corresponding cell is described. In a case where a frequency channel is shared in the DUSA (or the frequency channel is being shared), a split position for which a corresponding cell makes a request and a common split position defined in the DUSA are held. A notification of the common split position defined in the DUSA is sent through a selection information notification (1508 or 1509) from the NC (714) which will be described later. Further, in a case where a channel is shared in the DUSA, the number of frames which are currently allocated, the number of frames for which a request is made, and the number of frames defined in the ODFC are described. A notification of the number of frames defined in the ODFC is sent from a BS which is a contention request source through an FC notification (1405). Still further, this BS information is updated to new information at all time by periodically executing a peripheral information acquisition (902) sequence.

Next, the BS2 (702) performs channel acquisition (903). In the channel acquisition, the BS2 (702) initially creates a channel set. A specific creation method will be described later.

FIG. 12 illustrates a channel set information table of the 802.22 system. A channel set (1201) stores each set (channel number) of a channel (operating channel) which is being currently used, a backup channel which is used in a case where an operating channel cannot be used, and a candidate channel. Channels up to the candidate channel are not shared with adjacent cells and can be used in the normal mode. Corresponding cell priority sets (local priority sets) 1 to 3 include channels which cannot be used unless the channels are shared with adjacent cells in a case where the number of backup channels or candidate channels of a corresponding cell is small, and a channel is necessarily shared in a case where usable frequency channels obtained from the WSDB (713) are all used by the adjacent cells. A channel set of each BS is created on the basis of information obtained through the peripheral information acquisition (902). Specifically, the BS2 (702) creates a usable channel set in the BS, a backup channel set, and a candidate channel set in consideration of channels which are being currently used in each BS or backup channels, obtained from peripheral BS/CPE information (1003, 1004, 1005), among usable channels for each region, obtained through the DB information acquisition request (1001). Refer to NPL 1 in relation to details of a channel set creation method of a BS, and a selection method of a channel included in a corresponding cell priority set. In addition, the number of channels of the channel set or the priority set may be plural.

Referring to FIG. 9 again, if the channel set is created, the BS2 (702) determines (903) a channel to be used. In the 802.22 system, the BS2 (702) determines a channel to be used according to a selection algorithm called spectrum etiquette on the basis of the created channel set information. In the spectrum etiquette, the BS2 (702) selects a channel in an ascending order of item numbers of FIG. 12, that is, selects a channel described in the backup channel set if there is no channel described in the use channel set, and selects a channel described in the candidate channel set as a channel to be used (desired to be used) if there is no channel described in the backup channel set. In a case where a plurality of channels are described in the channel set, one channel may be selected at random, and, for example, channels used in base stations located as far as possible may be sequentially selected on the basis of the base station position information. The BS2 (702) determines that the "channel acquisition is successful" if a channel which is not shared with an adjacent cell is selected, and determines that the "channel acquisition fails" if a channel which is shared with an adjacent cell is selected. Whether or not a selected channel is shared with an adjacent cell is determined on the basis of whether or not the selected channel is included in channels which are used by peripheral BSs and are obtained through the peripheral information acquisition (902). If the channel acquisition is successful (904), the BS2 (702) does not perform interference determination which will be described later, and prepares (905) to start a data service in the normal mode by using the acquired frequency channel.

2-2. Channel Sharing Mode (Presence of CPE Interference): ODFC

If the channel acquisition fails, the BS2 (702) performs a data service in a channel sharing mode in which a channel is shared with an adjacent cell, and which channel sharing method is used is determined through interference determination (903). In the interference determination, as illustrated in FIG. 2, it is determined whether or not the CPE (205, 206) belonging to adjacent another BS (203) is located at a position where interference is given to the BS (204).

Figure 13:
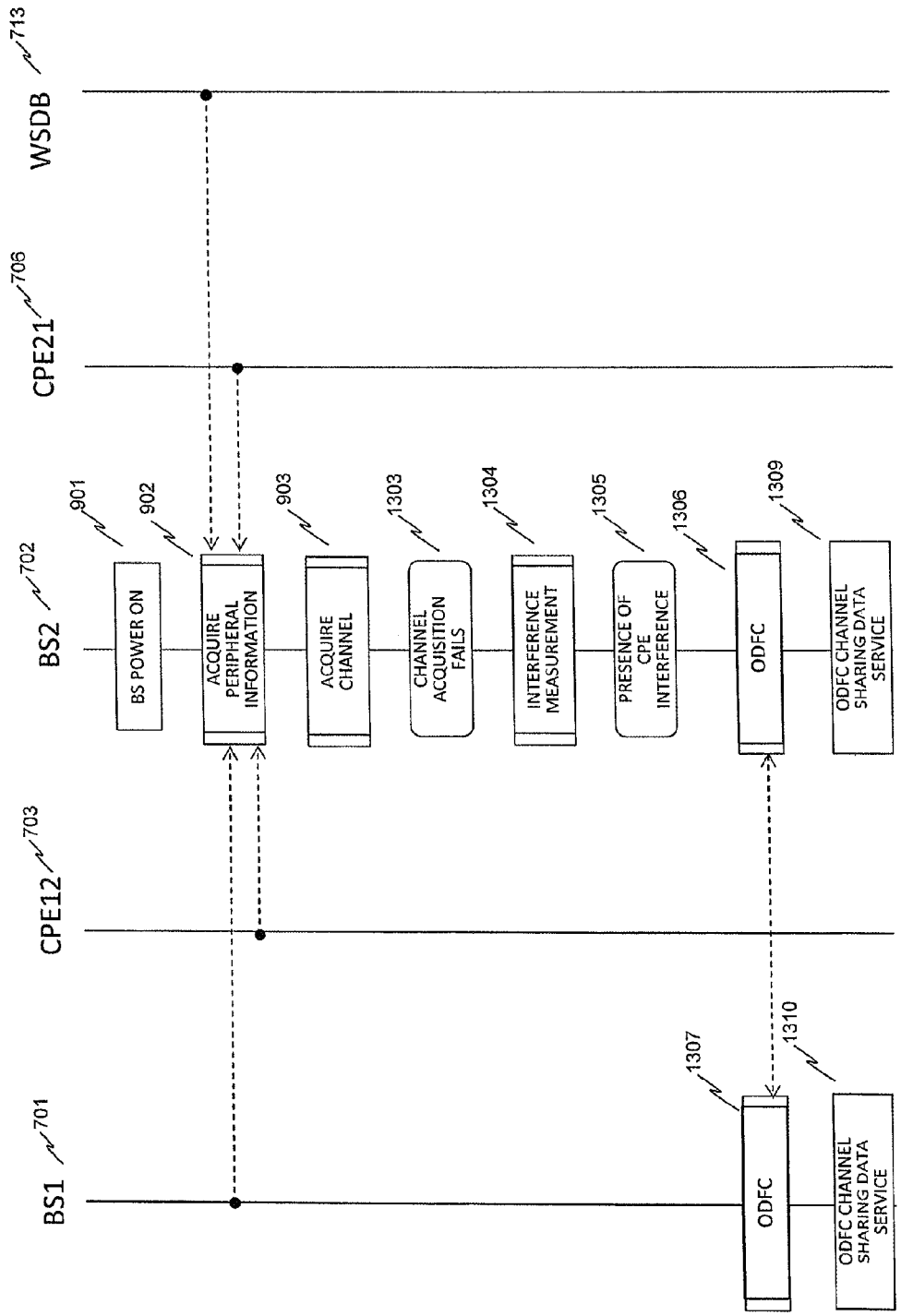
FIG. 13 is a diagram illustrating a sequence in a channel sharing mode (the presence of interference between CPEs).

FIG. 13 illustrates a sequence in the channel sharing mode (the presence of CPE interference). First, a description will be made of a sequence (FIG. 13) in a case where the CPE is located at a position where interference is given thereto. In FIG. 13, the same operation as in the normal mode is performed up to the peripheral information acquisition (902). If the channel acquisition fails (1303) in the channel acquisition (903) of FIG. 13, the BS2 (702) performs (1304) interference determination. In the interference determination, the BS2 (702) determines whether or not the CPE is located at a position where interference is given thereto, described above. The BS2 (702) performs this determination on the basis of whether or not a signal is received from a CPE belonging to another BS which uses a channel which is desired to be used. For example, in the 802.22 system, it is determined whether or not a CBP from the CPE belonging to another BS is decoded.

If it is determined that the CPE is located at a position where interference is given thereto (1305), the BS2 (702) shares a channel in a second channel sharing method in which a frame of a shared channel is shared in a time division manner in relation to sharing of a frequency channel. For example, in the 802.22 system, on demand frame contention (ODFC) is performed.

Figure 14:
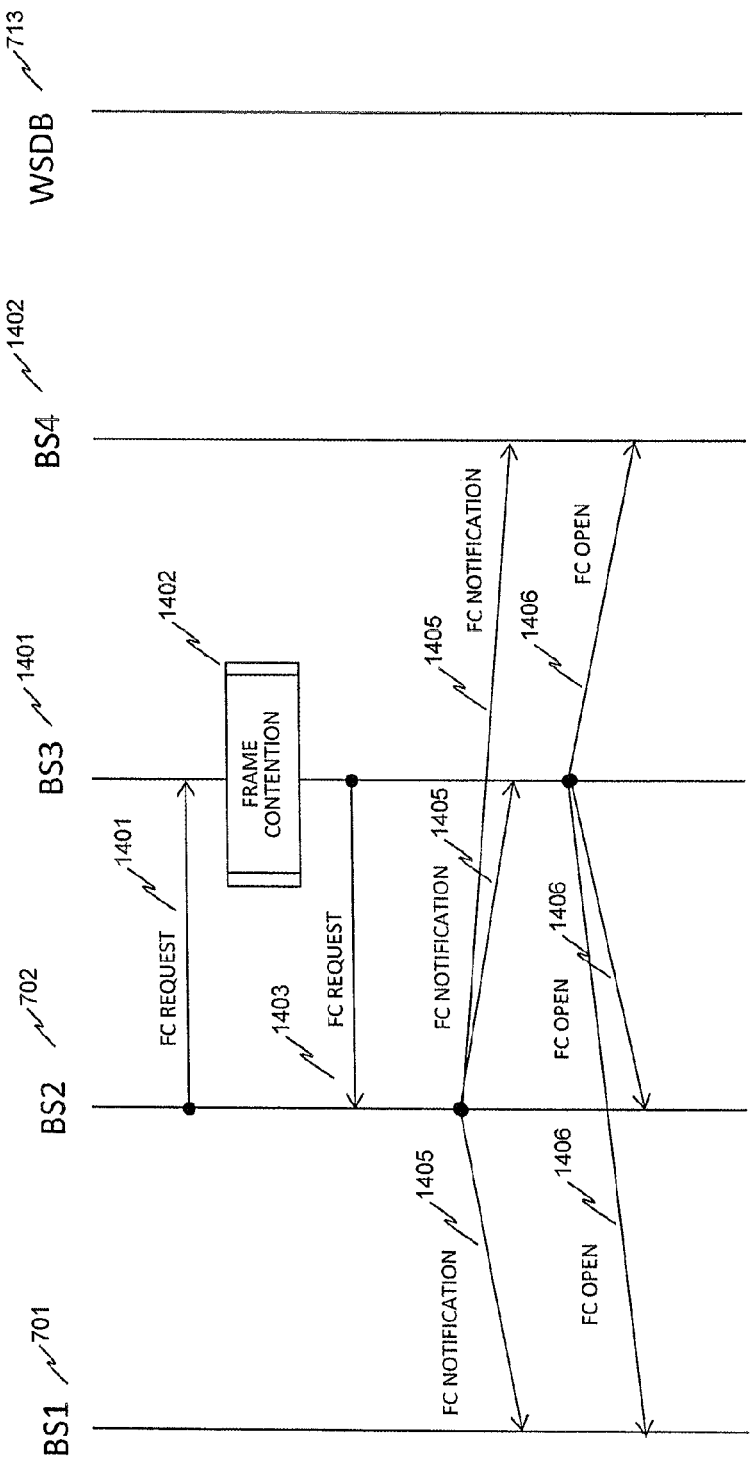
FIG. 14 is a diagram illustrating a sequence of ODFC.

FIG. 14 illustrates a sequence of the ODFC. In the ODFC of the 802.22 system, as illustrated in FIG. 14, the BS2 (FC_SRC) (702) which makes a request for sharing transmits an FC request (1401) to a BS3 (FC_DST) (1401) which receives the request. On the FC_DST side, the BS3 (1401) performs contention on the basis of its own request and the request of the FC_SRC side, and determines the number of frames which can communicate in each BS, a frame position in a super frame, and the like. Refer to NPL 1 in relation to details of the ODFC process. Each BS performs communication (ODFC channel sharing service) with a CPE belonging to the BS by using the number of frames in the super frame and the frame position information, determined in the ODFC.

2-3. Channel Sharing Mode (Absence of CPE Interference): DUSA

On the other hand, in a case where the CPE is located at a position where interference is not given thereto, a channel is shared in a first channel sharing method. For example, in the 802.22 system, DS/US split adjustment (DUSA) is performed.

Figure 15:
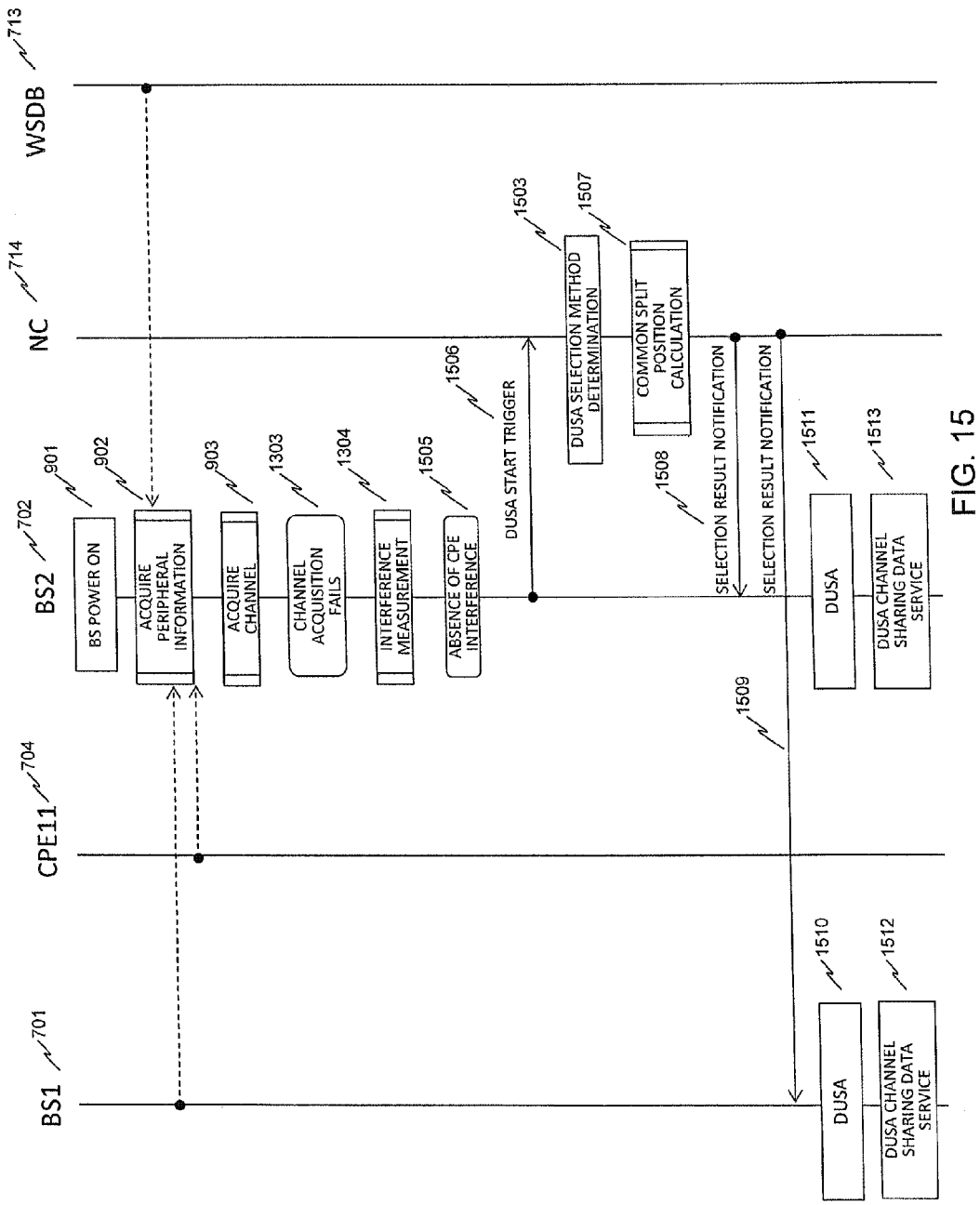
FIG. 15 is a diagram illustrating a sequence in the channel sharing mode (the absence of interference between CPEs).

FIG. 15 illustrates a sequence of the channel sharing mode (absence of CPE interference). Hereinafter, an operation sequence thereof will be described with reference to FIG. 15. FIG. 15 is the same as FIG. 13 up to the interference determination (1304). If it is determined in the interference determination (1304) that there is no interference from the CPE (1505), the BS2 (702) transmits (1506) a DUSA start trigger to the NC (714). The NC (714) receives the trigger and starts a DUSA process.

Figure 16:
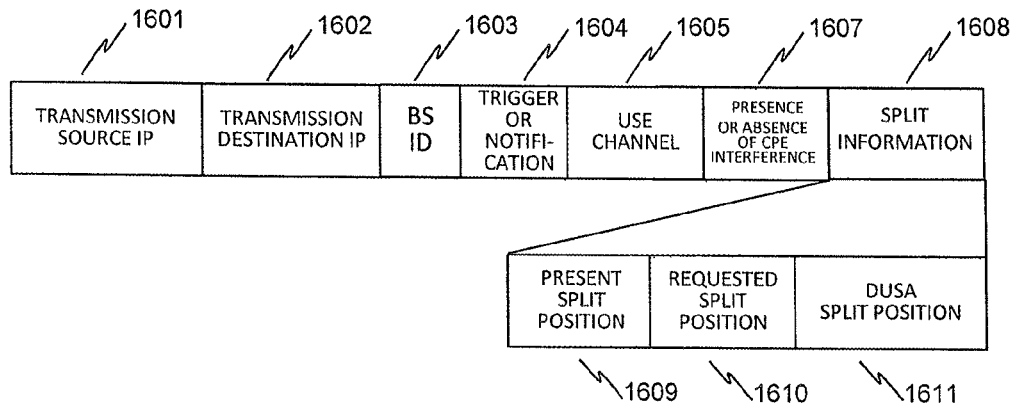
FIG. 16 is a diagram illustrating a frame configuration example (between a BS and an NC).

FIG. 16 illustrates a frame configuration example which is used to send and receive a message between the BS and the NC. The DUSA start trigger includes a transmission source IP (1601) which is an IP address of the base station, a transmission destination IP (1602) which is an IP address of the NC (714), an ID (1603) of the base station, identification information (1604) for identifying whether the message is a trigger from the BS or a notification toward the BS, a channel which is used (or desired to be used) by the BS, the presence or absence (1607) of interference from a CPE belonging to an adjacent base station, split information (1608), and the like. The split information (1608) includes at least the present split position (1609) and a requested split position (1610) if the trigger or notification identification information 1604 is a trigger, and includes at least split position information (1611) determined by the NC if the identification information is a notification. When this frame is used as a DUSA start trigger, trigger or notification identification information (1604) may be a notification, and the DUSA split position (1611) may be a vacancy. In addition, when this frame is used as a selection result notification (1508, 1509) which will be described later, the trigger or notification identification information (1604) may be a notification, and the present split position (1609) and the requested split position (1610) may be a vacancy. In addition, this configuration example shows an example in which the frame is used for both transmission and reception, but a frame memory formed by only information necessary for transmission and reception may be used, and any frame configuration may be used as long as equivalent information can be transmitted. For example, in the 802.22 system, information pieces equivalent to the above-described respective information pieces 1601 to 1611 can be transmitted by transmitting the SCH or the CBP by using a simple network management protocol (SNMP), instead of the frame configuration of FIG. 16. When the DUSA start trigger (1506) is received, the NC (714) determines a selection method of a common split position used in the DUSA in DUSA selection method determination (1503). A selection method is selected by policy of an operator of the wireless communication system or the NC.

Here, FIG. 21 illustrates a DUSA selection method determination table. A relationship between policy and a selection method is as illustrated in FIG. 21 (2101). A polish number is predefined by an operator, and a selection method corresponding to the polish number is used.

If a selection method of a common split position is determined, the NC (714) calculates a common split position by using the selected split position selection method in a common split position calculation process (1507). In the common split position calculation (1507), the NC (714) calculates a common split position which is used in common by a plurality of base stations sharing a channel, by using channel sharing information of the NC (714).

FIG. 17 illustrates a channel sharing information table. The name (1701) and an ID (1702) of a BS under the competence of the NC, a channel (1703) which is used (which is to be shared), the presence or absence (1704) of interference from a CPE belonging to an adjacent BS in a channel which is used (which is to be shared) by the BS, the present split position, a requested split position, a frequency sharing state (1707), a selection method (1708), and the common split position (1709) determined in this common split position calculation (1507), are described in channel sharing information (1700). As the selection method (1708), the split position selection method (policy; refer to FIG. 21) selected in the above-described DUSA selection method determination (1503) is recorded.

Figure 18:
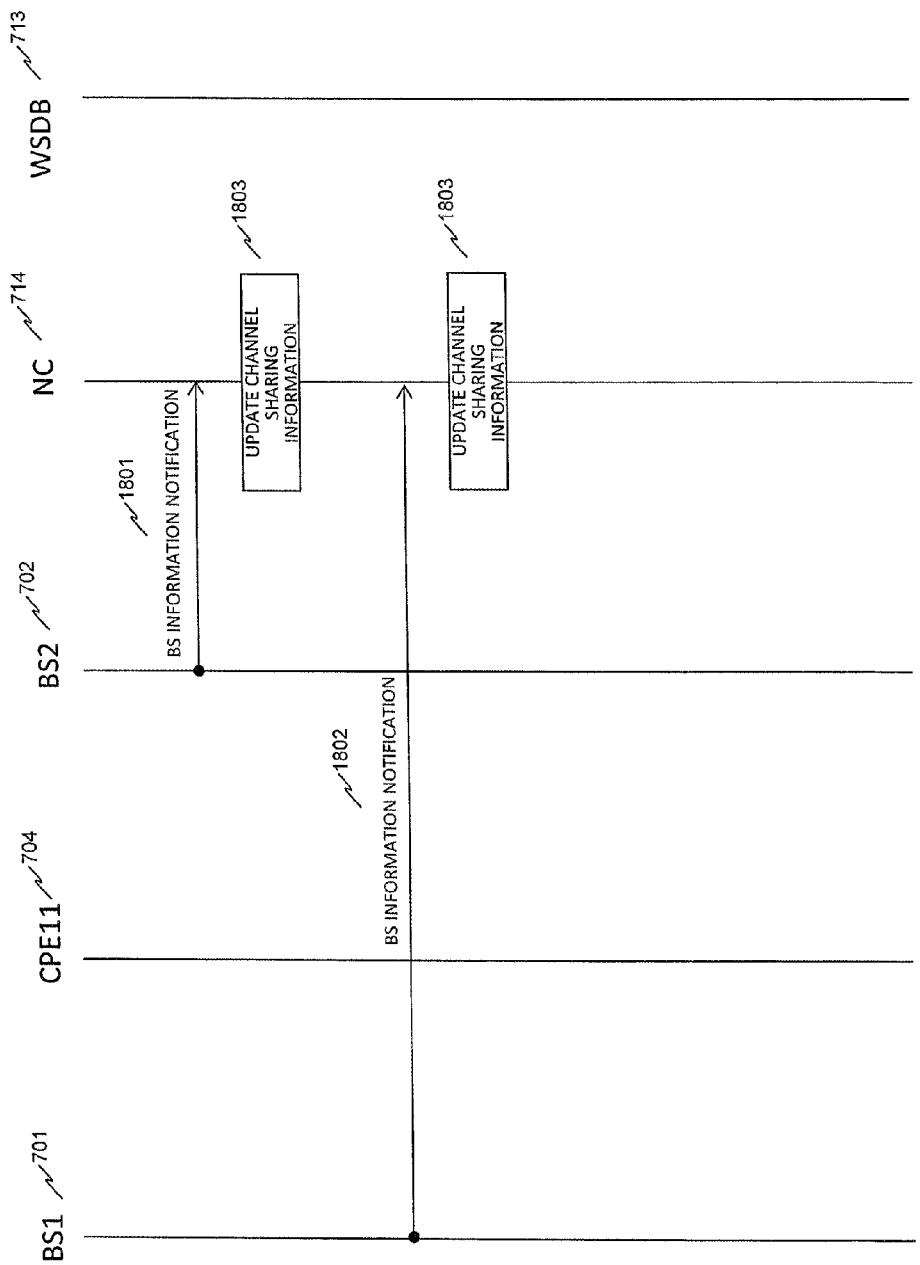
FIG. 18 is a diagram illustrating a BS information notification time sequence.

FIG. 18 illustrates a BS information notification time sequence. Information regarding the channel sharing information table (1700) of BSs other than the corresponding BS is collected, created, and updated (1803, 1804) through a BS information notification (1803) in the BS information notification sequence illustrated in FIG. 18. In the BS information notification messages (1801 and 1802), content of the BS information table (1101) of each BS is described, and at least a BS ID, a use channel, the present split position, a requested split position, and a sharing state are included, and a DUSA split position is also described in a case where a channel is shared in the DUSA. In addition, the BS information notification messages (1801, 1802) may include interference presence information. The BS information notification messages have the frame configuration of FIG. 16, and the trigger or notification identification information (1605) is transmitted as a notification. The BS information notification may be periodically transmitted from the base station side, and may be transmitted in response to a request from the NC. The NC (714) derives a common split position according to the selected split position selection method, by using the channel sharing information table. For example, in a case where a use (sharing) channel number is 3, and polish is 0, 160 (bit) which is a mean value of requested split positions of the BS3, BS4, and BS5 becomes a DUSA determination split position. For example, in a case where a use (sharing) channel number is 3, and polish is 1, 200 (bit) which is a split position of a BS having the largest DS length becomes a DUSA determination split position.

The NC (714) transmits the determined common split position information to the BSs (701 and 702) through selection result notifications (1508, 1509), and the respective BSs share a channel at the common split position and start (1510, 1511) a data service. In a case where policy is 4, a split position is used which is selected in a policy number in which the estimated frequency channel use efficiency is highest among the policy number 0 to the policy number 3. A method of calculating the estimated channel use efficiency will be described later in detail in a flowchart (FIG. 26) illustrating that the NC calculates a split position.

FIG. 19 illustrates a sharing request reception sequence. As illustrated in FIG. 19(a), when the CPE1 requests the BS1 to add/reduce a frame from inside of a cell (1901), the BS remakes a channel set, acquires a channel again, and performs a process in the sequences of FIGS. 9, 13 and 15 according to interference. In addition, as illustrated in FIG. 19(b), also when a new BS (BS3) which does not share a channel makes a request for channel sharing (1903), the BS remakes a channel set, acquires a channel again, and performs a process in the sequences of FIGS. 9, 13 and 15 according to interference.

The BS or the CPE which shares a frequency channel monitors a transmission standby state of a transmission buffer which temporarily holds transmission data at all times, and changes a DUSA selection method if abnormality is detected, and calculates a common split position again so as to perform improvement.

Figure 20:
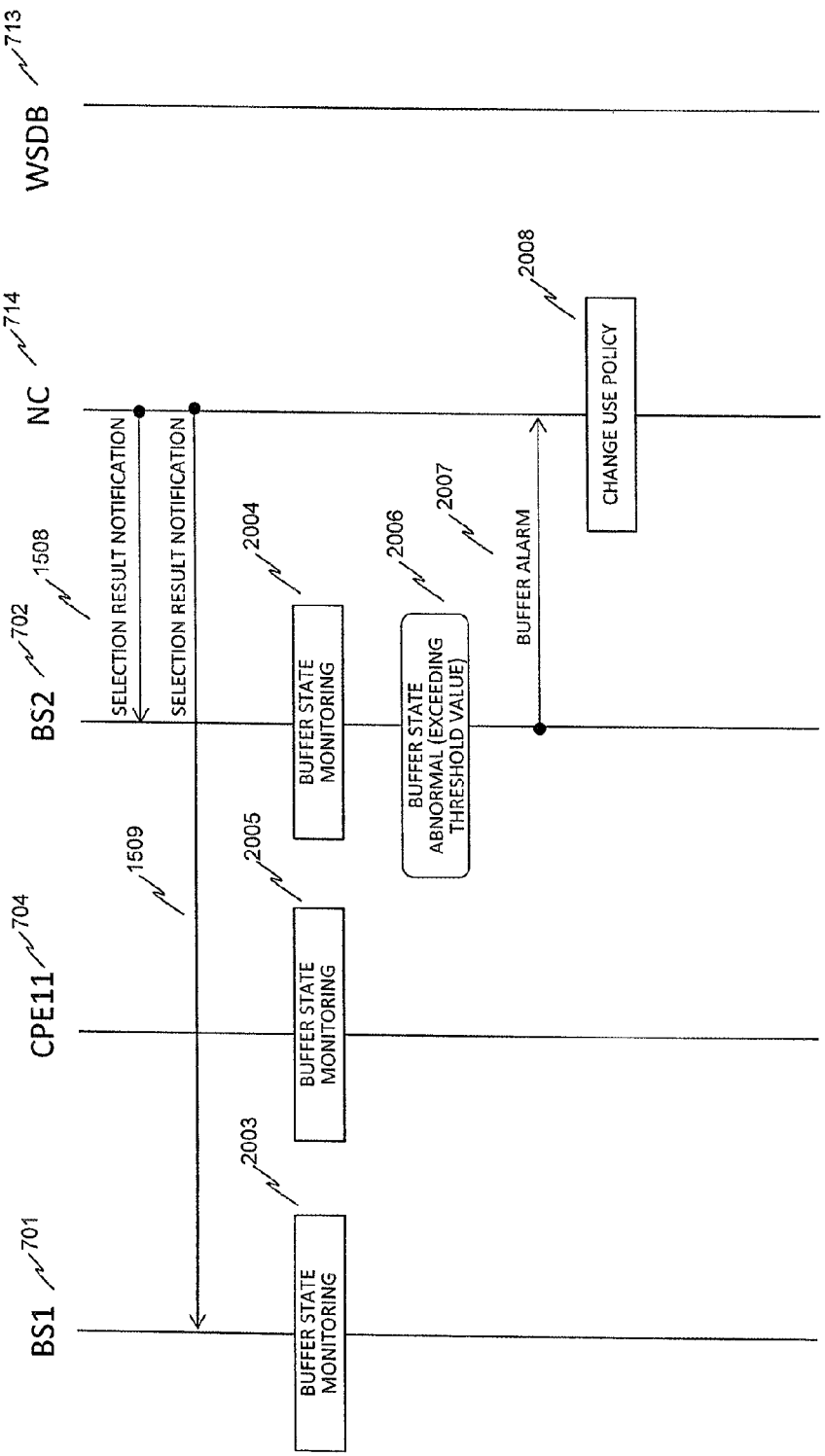
FIG. 20 is a diagram illustrating a DUSA selection method update sequence.

FIG. 20 illustrates a DUSA selection method update sequence. When selection result notifications (1508 and 1509) indicating channel sharing start are received from the NC (714), the BSs (BS1 and BS2) or the CPE (CPE11) starts (2003, 2004, 2005) monitoring a transmission standby queue state of the transmission buffer which temporarily holds transmission data. In a case where a queue length of the transmission buffer exceeds a predefined threshold value (2006), the BSs (BS1 and BS2) or the CPE (CPE11) (in this example, the BS2 (702)) determines that transmission is delayed, and transmits a buffer alarm to the NC (714) (2007). When the buffer alarm is received, the NC (714) changes (2008) policy of a corresponding base station. A policy number may be changed at random. Polish may be selected according to any one of a descending order of policy numbers, an ascending order of policy number, and an order defined by an operator. The subsequent sequence is the same as the sequence from the split position calculation (1507) of FIG. 15, but the NC (714) performs the common split position calculation (1507) again according to a common split position calculation method defined by the changed policy.

3. Apparatuses and Flowcharts

Here, a description will be made of apparatus configuration examples of the BS and the NC of first Example and flowcharts of the respective apparatuses according to the present example.

3-1. BS

Figure 22:
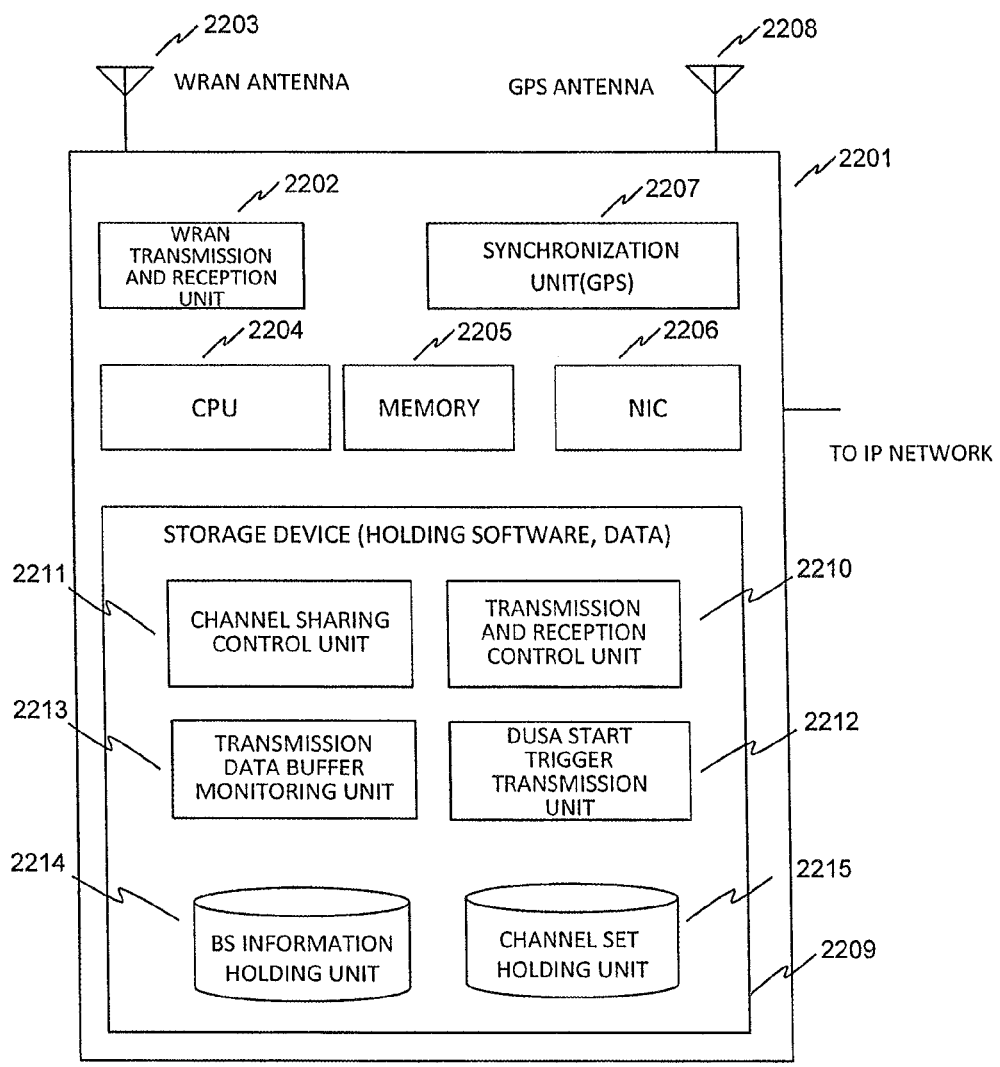
FIG. 22 is a diagram illustrating a BS configuration example.

FIG. 22 illustrates a configuration example of the BS. As hardware, the BS includes an antenna (2203) and a transmission and reception unit (2202) conforming to a wireless method of the WRAN, a GPS antenna (2208) for measuring a position of the BS, a synchronization unit (2207) which performs synchronization between base stations by using GPS, a CPU (2204) which controls the entire apparatus, a memory (2205), a network interface card (NIC) (2206) which is a priority line interface for connection to an IP network, and a storage device which stores software or a database. As software, the BS includes a transmission and reception control unit (2210) which is required to operate a base station of the WRAN, a channel sharing control unit (2211) which is required to share a channel between a plurality of base stations, a DUSA start trigger transmission unit (2212), and a transmission data buffer monitoring unit (2213) which monitors a buffer state of transmission data. As the database, the BS includes a channel set holding unit (2214) and a BS information holding unit (2215).

Figure 23:
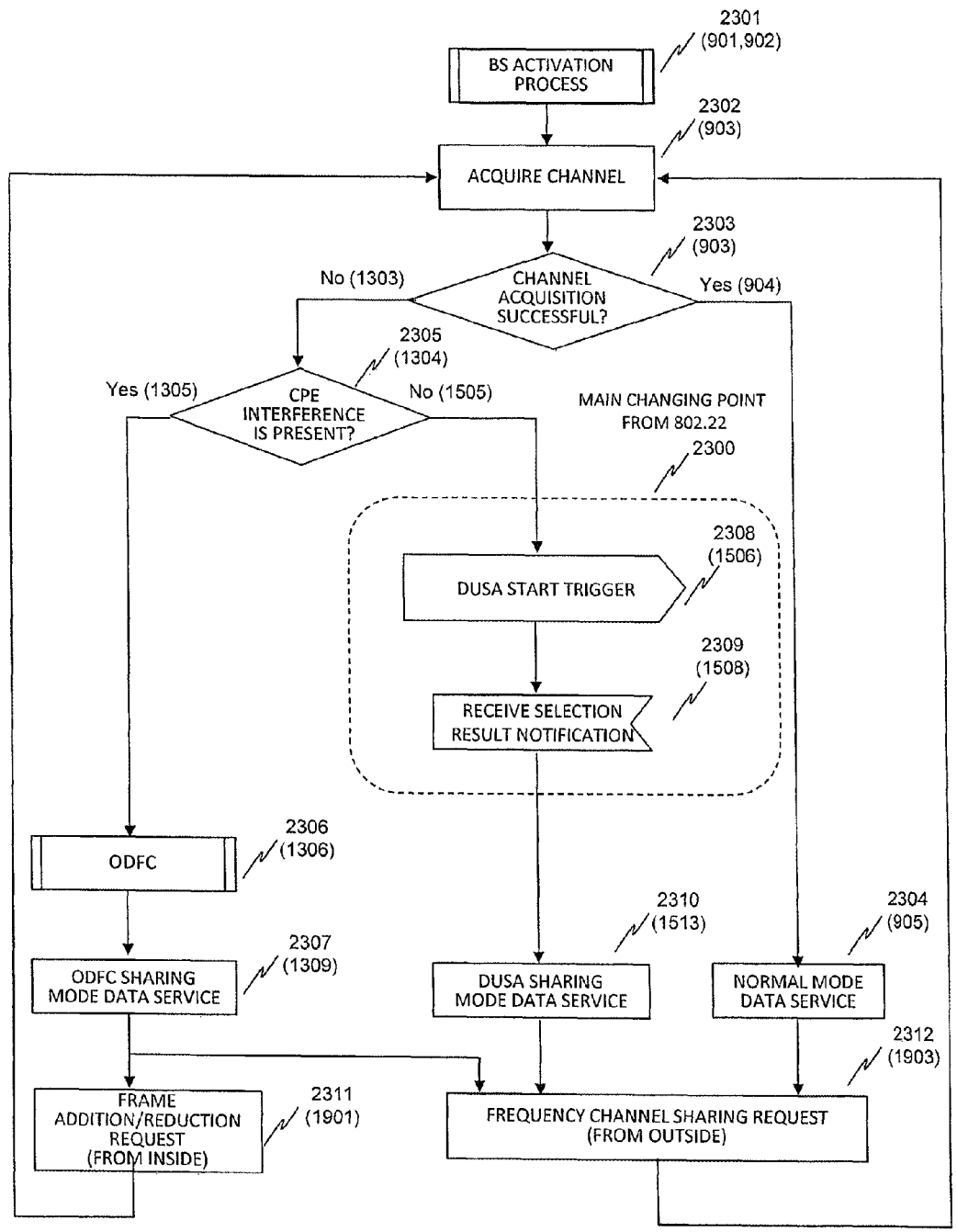
FIG. 23 is a flowchart illustrating that BSs share a channel.

FIG. 23 is a flowchart illustrating channel sharing of the BS. The channel set holding unit (2215) holds a channel set information table as illustrated in FIG. 12, and the BS information holding unit (2214) holds a BS information table as illustrated in FIG. 11. The channel sharing control unit (2211) performs an operation according to the channel sharing flowchart illustrated in FIG. 23. A portion indicated by a dotted line (2300) is remarkably different from the operation flow in the sharing mode of the 802.22 system illustrated in FIG. 1. Refer to FIG. 9 in relation to the reference numerals 900s, FIG. 13 in relation the reference numerals 1300s, FIG. 15 in relation to the reference numerals 1500s, FIG. 19 in relation to the reference numerals 1900s, and FIG. 20 in relation to the reference numerals 2000s. If the BS is powered on (901), first, the BS performs (2301) peripheral information acquisition (902). Then, the BS acquires a channel in channel acquisition (903, 2302). The BS determines whether or not the channel acquisition is successful in a channel acquisition success branch (2303), and performs (905) a data service in a normal mode if the channel acquisition is successful (904). If the channel acquisition fails (1303), the BS determines (2305, 1304) whether or not there is interference from the CPE. If there is interference from the CPE (1305), the BS performs (2306, 1306) contention in the ODFC, and performs (2307, 1309) a data service by using a frame defined in the ODFC. On the other hand, if there is no interference from the CPE (1505), the BS transmits (2308, 1506) a DUSA start trigger to the NC (714), receives (2309, 1508) a notification of common split position information or the like determined by the NC (714), adjusts a split position (1511), and performs (2310, 1513) a data service by using channel sharing in the DUSA. In addition, the DUSA start trigger transmission unit (2212) creates and transmits (1506) the DUSA start trigger indicated by the reference numeral 1506 of FIG. 15.

Figure 24:
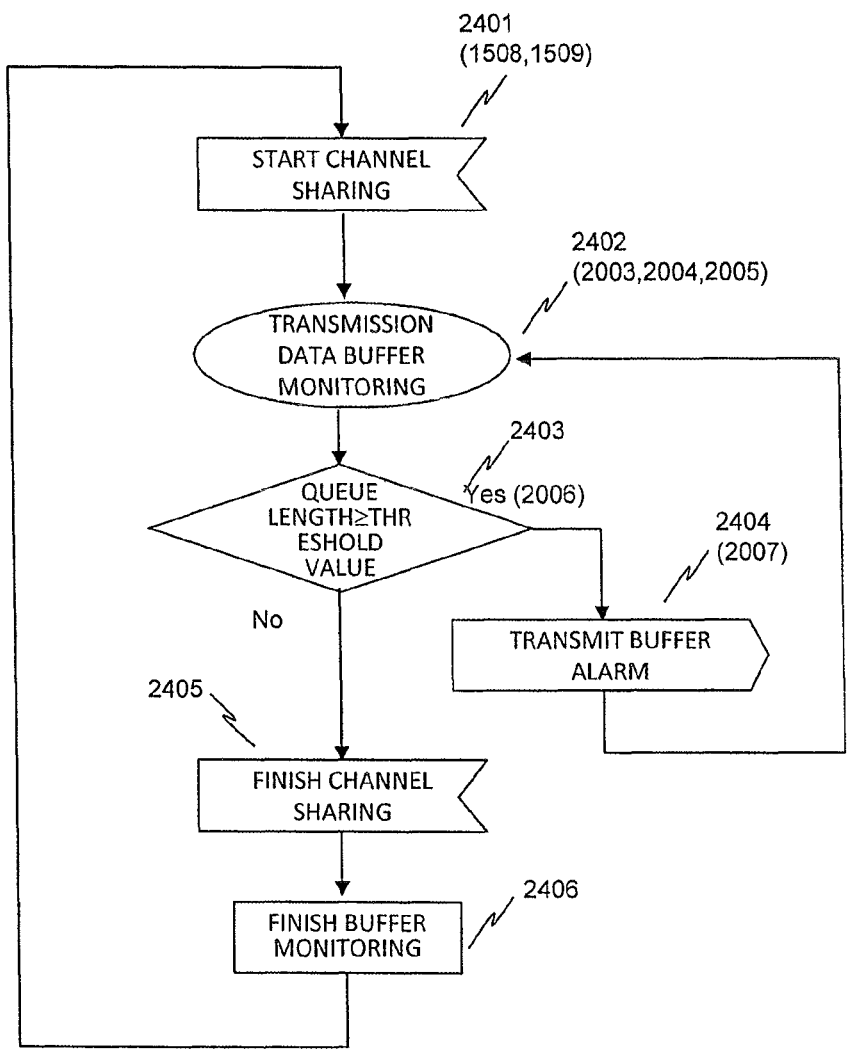
FIG. 24 is a flowchart illustrating that a BS updates a DUSA selection method.

Here, FIG. 24 is a flowchart illustrating that a BS updates a DUSA selection method. The transmission data buffer monitoring unit (2213) performs an operation according to the DUSA selection method update flowchart illustrated in FIG. 24. When a channel sharing start trigger is received from the NC through a selection result notification (2401, 1508, 1509), the BS monitors (2402, 2003, 2004, 2005) the transmission data buffer. If a queue length of transmission data exceeds a threshold value (2006), a buffer alarm is transmitted (2404, 2007) to the NC. The monitoring of the transmission data buffer is finished (2406) by a channel sharing end signal (2405), and the BS waits for a channel sharing start trigger to come again. The channel sharing end signal is output, for example, in a case where there is no request from the inside, and a frequency channel is open, or a case where a usable frequency channel in a corresponding region is added, and thus frequency sharing is not necessary.

3-2. NC

Figure 25:
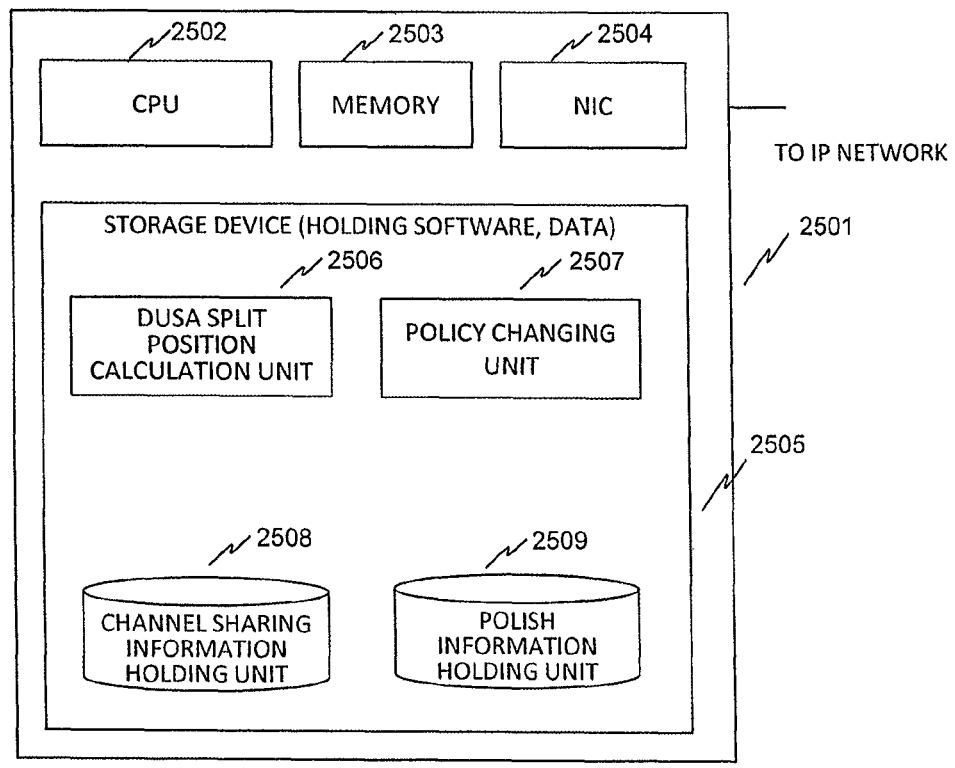
FIG. 25 is a diagram illustrating an NC configuration example.

FIG. 25 illustrates a configuration example of the NC (714) according to the present example. As hardware, the NC includes a CPU (2502) which controls the entire apparatus, a memory (2503), a network interface card (NIC) (2504) which is a priority line interface for connection to an IP network, and a storage device (2505) which stores software or a database. As software, the NC includes a DUSA split position calculation unit (2506) which determines a DUSA split position and a policy changing unit (2507) required to change a DUSA selection method. As the database, the NC includes a channel sharing information holding unit (2508) and a policy information holding unit (2509). The channel sharing information holding unit (2508) holds a channel sharing information table as illustrated in FIG. 17, and the policy information holding unit (2214) holds a DUSA selection method determination table as illustrated in FIG. 21.

Figure 26:
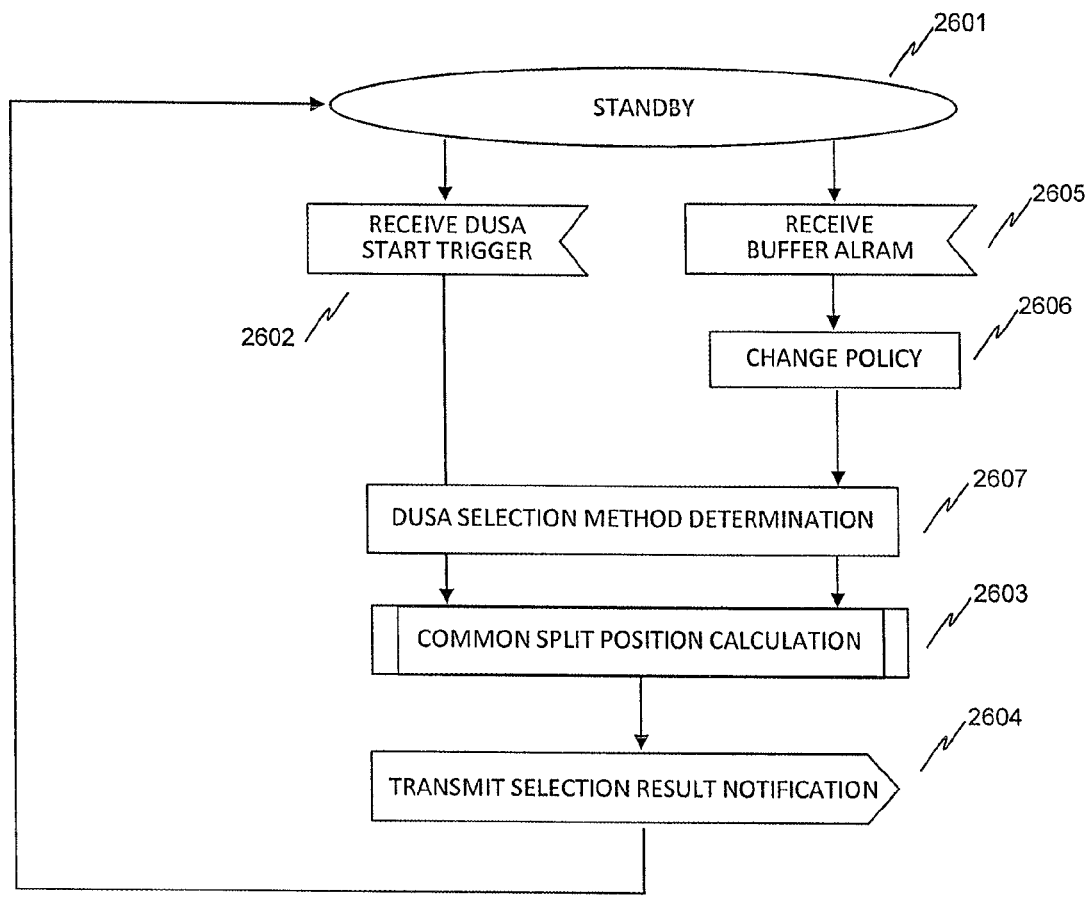
FIG. 26 is a flowchart illustrating calculation of a common split position of the NC.

FIG. 26 is a flowchart illustrating calculation of a common split position of the NC. The DUSA split position calculation unit (2506) performs an operation according to the split position calculation flowchart illustrated in FIG. 26. In addition, refer to FIG. 15 in relation to the reference numerals 1500s, and FIG. 20 in relation to 2000s. The NC stands by (2601) until any process start trigger is received, and receives (1801, 1802) a BS information notification in response to a periodic request or a request from the NC (714) as illustrated in FIG. 18, so as to update (1803, 1804) the channel sharing information table (1700). When a DUSA start trigger is received (2602) from the BS, the NC (714) selects (2607, 1503) a common split position selection method which is used in the DUSA by using predefined policy, and calculates (2603, 1507) a common split position by using the channel sharing information table.

Here, a description will be made of an example of a calculation method of DUSA channel use efficiency in a case where a policy number is 4, that is, a split position is selected in which the estimated frequency channel use efficiency is highest among the policy number 0 to the policy number 3. As represented in the following Equation 1, a US length (DUSA_US_DURATION) which is sent per frame is calculated by subtracting a split position (DUSA_DS_DURATION) which is calculated in a selection method for each item of policy (the policy numbers 0 to 3) from a frame length (FRAME_DURATION). In addition, as represented in the following Equations 2 and 3, the DUSA estimated channel use efficiency is given as an inverse number of a value (the number of frames (DUSA_MAX_FRAME_NUM) required to transmit a US which can be originally sent with one frame in a normal mode) which is obtained by dividing a split position (MAX_US_DURATION) of a base station in which a requested split position is the minimum among base stations sharing a frequency channel in the DUSA, by the US length (DUSA_US_DURATION) which is sent per frame.

$$DUSA\_US\_DURATION = (FRAME\_DURATION - DUSA\_DS\_DURATION) \quad \text{Equation 1}$$

$$DUSA\_MAX\_FRAME\_NUM = MAX\_US\_DURATION / DUSA\_US\_DURATION \quad \text{Equation 2}$$

$$DUSA \text{ estimated channel use efficiency} = 1 / DUSA\_MAX\_FRAME\_NUM \quad \text{Equation 3}$$

In a case where a policy number is 4, the DUSA estimated channel use efficiency is calculated from policy numbers 0 to 3, and a common split position is used which is calculated in a policy number in which the DUSA estimated channel use efficiency is highest among them.

On the other hand, when a buffer alarm is received (2605, 2007) from BS during the standby, the NC changes (2607, 2008) a predefined policy, determines (2607, 1504) a DUSA selection method corresponding to the changed policy, and calculates (2603, 1507) a common split position in the determined selection method. A policy number may be changed at random. Polish may be selected according to any one of a descending order of policy numbers, an ascending order of policy number, and an order defined by an operator. The determined common split position is transmitted (2604, 1508, 1509) to all BSs sharing a corresponding channel through a selection result notification, and the NC returns to a standby state again.

4. Effects of First Example

According to first Example, since an optimum common split position can be determined on the basis of split positions of a plurality of cells, it is possible to use a frequency channel with higher efficiency than in a method of adjusting a split position to the maximum downstream subframe.

In addition, according to first Example, since split information of a plurality of cells sharing a frequency channel can be collected by the network controller in a concentration manner, and control can be performed, convergence and synchronization of a split position can be performed in a shorter period of time than in a method in which information is sequentially sent and received between adjacent cells and control is performed, and thus it is possible to reduce interference given due to a deviation of a split position.

[Second Example]
C. Second Embodiment

Second Example in the present embodiment will be described.

In first Example, in a case where there is no interference from a CPE, the first sharing method is used in which a frequency channel is shared by using a common split position, but, second Example has a feature that an estimated value of channel use efficiency is calculated in the first sharing method and in a second channel sharing method in which a frame of a shared channel is shared in a time division manner, and channel sharing is performed by using a channel sharing method having higher channel use efficiency. Hereinafter, second Example will be described in detail.

1. System

A system is the same as that of first Example and thus description thereof will be omitted.

1.2. Operation 2-1. Normal Mode

An operation in a normal mode is the same as that of first Example and thus description thereof will be omitted.

2-2. Channel Sharing Mode (Presence of CPE Interference): ODFC

An operation in a channel sharing mode is the same as that of first Example and thus description thereof will be omitted.

2-3. Channel Sharing Mode (Absence of CPE Interference): DUSA

Figure 27:
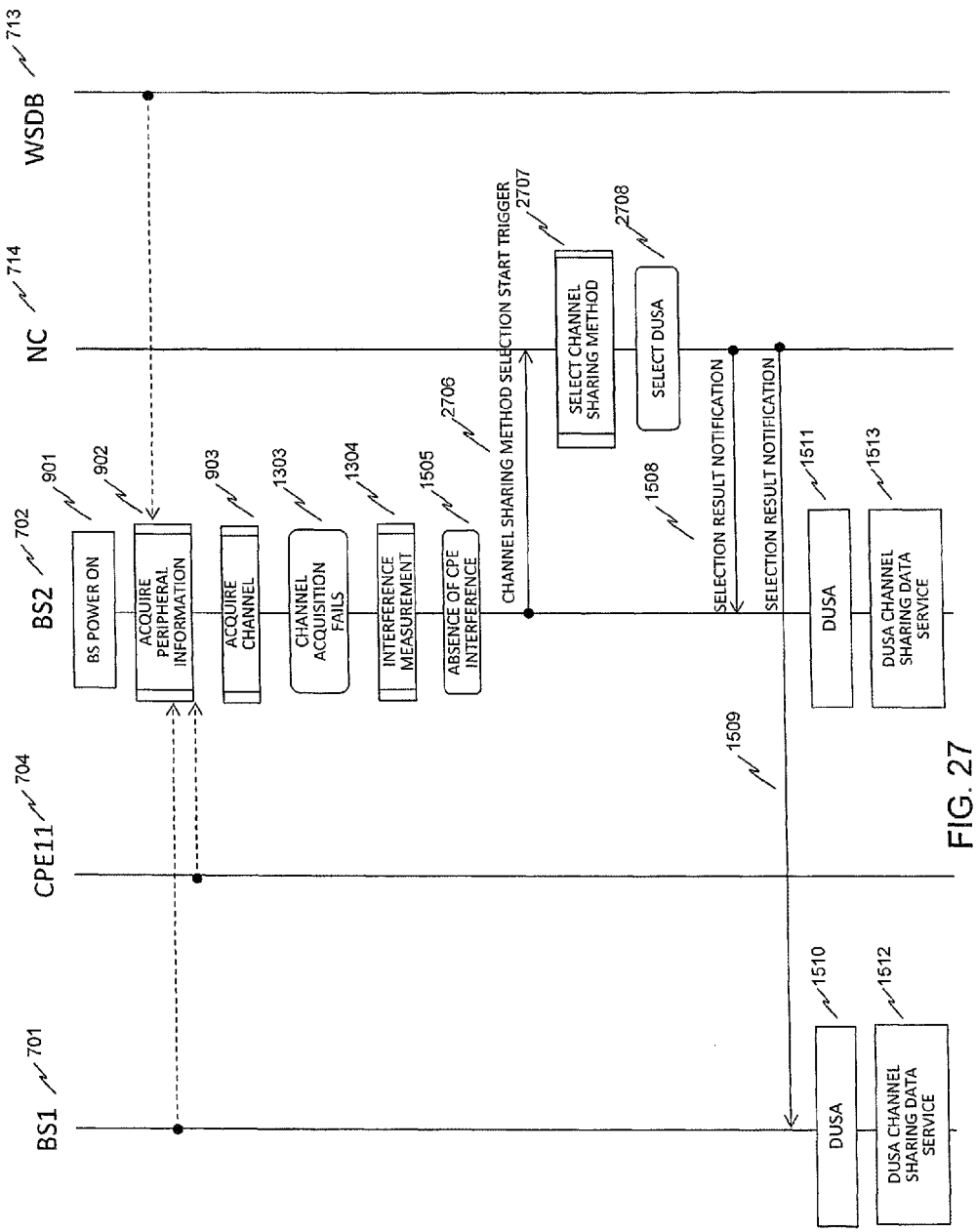
FIG. 27 is a diagram a channel sharing (the absence of interference with a CPE, and DUSA selection) mode sequence according to second Example.

FIG. 27 illustrates a time sequence in a case where a channel sharing method is selected. A sequence is the same as in FIG. 15 illustrating the channel sharing sequence of first Example up to the CPE interference absence state (1505). In second Example, the BS2 (702) transmits a channel sharing method selection start trigger (2706) to the NC (714). A frame configuration used for this trigger may employ the configuration illustrated in FIG. 16 without change, and disclosed content is also the same as the DUSA start trigger of first Example. However, in second Example, in a case where the trigger or notification identification information is received as a trigger in the frame of FIG. 16, the NC recognizes the trigger as a channel sharing method selection start trigger. The NC receives this channel sharing method selection start trigger (2706), and selects (2707) a channel sharing method. In the channel sharing method selection (2707), channel use efficiency of DUSA and channel use efficiency of ODFC are compared with each other, and a sharing method having higher channel use efficiency is selected. The channel sharing method selection will be described later in detail in a flowchart (FIG. 31) in which the NC selects a channel sharing method. If the DUSA is selected (2708) in the channel sharing method selection (2707), the NC determines a common split position which is used in common by a BS sharing a channel. A determination method is the same method as the common split position calculation (1507) of FIG. 15, and the subsequent operation is also the same as the operation described in FIG. 15, and thus description thereof will be omitted. In addition, if the ODFC is selected in the channel sharing method selection (2707), the split position calculation (1507) is not performed, and the selection result notification (1508) for indicating that the ODFC is selected is transmitted to the BS2 (702) which is a transmission source. The subsequent operation is the same as the operation from 1306 of FIG. 13.

Further, also in second Example, a transmission buffer state is monitored in the same manner as in first Example, and this operation sequence is the same as that of first Example illustrated in FIG. 20.

3. Apparatuses and Flowcharts

3-1. BS

Figure 28:
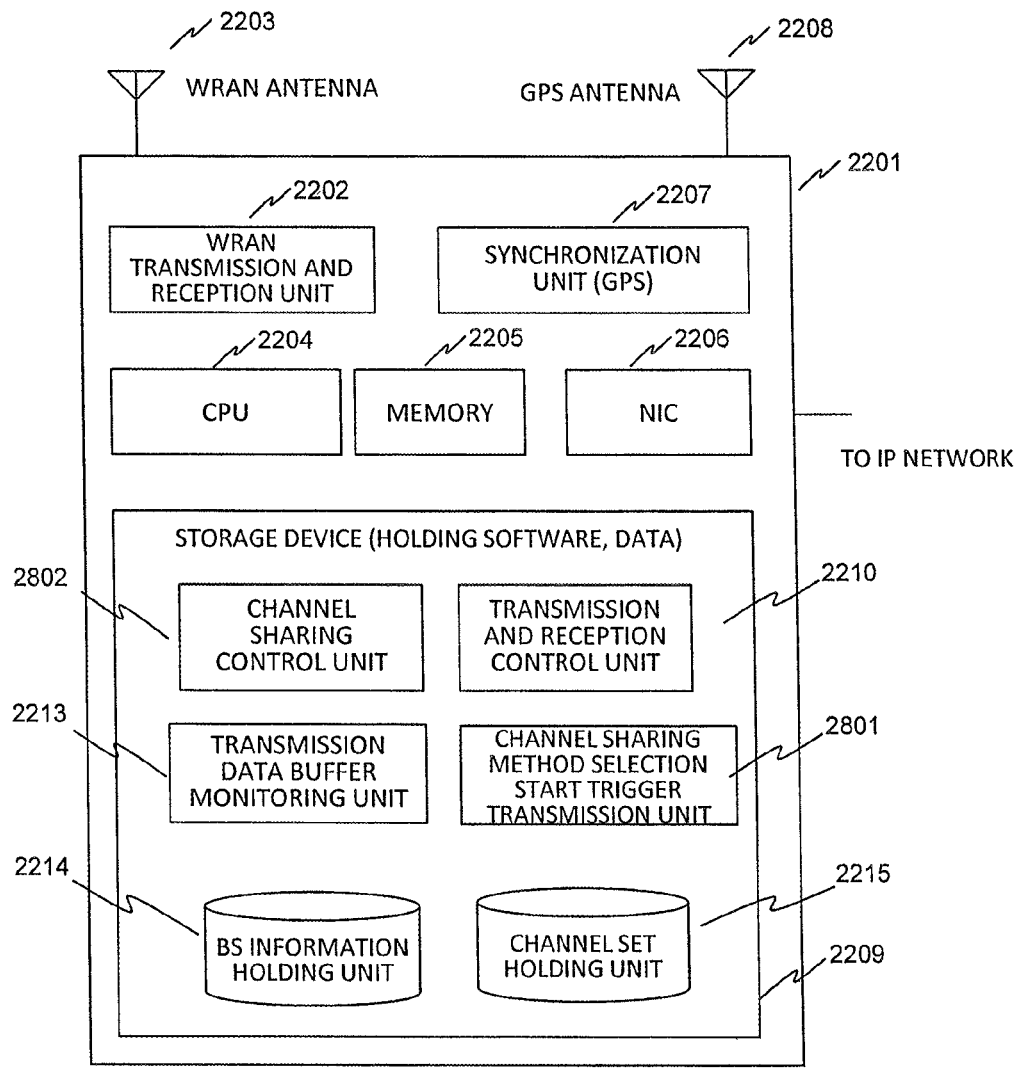
FIG. 28 is a diagram illustrating a BS configuration example according to second Example.
Figure 29:
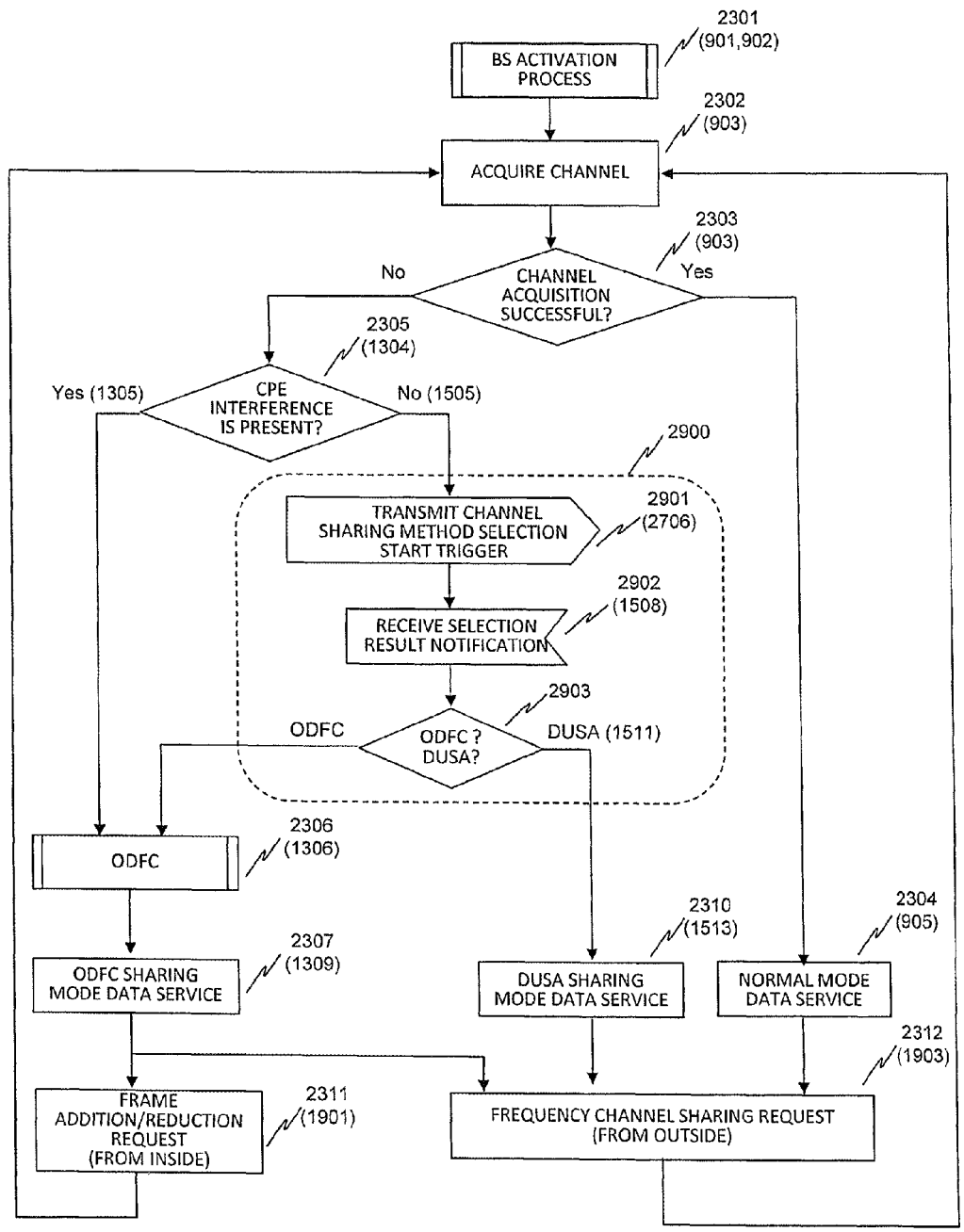
FIG. 29 is a channel sharing flowchart of the BS according to second Example.

Next, a description will be made of apparatus configuration examples of second Example and flowcharts of the respective apparatuses according to the present example. FIG. 28 is a configuration diagram of the BS, and FIG. 29 is a flowchart related to the BS. Differences from first Example are that a channel sharing method selection start trigger transmission unit (2801) is provided instead of the DUSA start trigger transmission unit (2212), and content of a process performed by a channel sharing control unit (2802) is different therefrom. A frame configuration and timing of a message which is transmitted by the channel sharing method selection start trigger transmission unit (2801) are the same as those of first Example. There is a difference in that, in first Example, when the trigger signal is received, a DUSA common split position is calculated, whereas, in second Example, a sharing method having higher frequency channel use efficiency is selected of the DUSA and the ODFC.

FIG. 29 is a channel sharing flowchart of the BS according to second Example. The channel sharing control unit (2802) performs an operation according to the channel sharing flowchart illustrated in FIG. 29. A difference from the flowchart of first Example illustrated in FIG. 23 is a portion (2900) surrounded by a dotted line, that is, a channel sharing method selection start trigger is transmitted (2901, 2706)), a selection result notification is received (2902, 1508) from the NC (714), and a channel sharing method is changed (2903) depending on the received result. Refer to FIG. 9 in relation to the reference numerals 900s, FIG. 13 in relation the reference numerals 1300s, FIG. 15 in relation to the reference numerals 1500s, FIG. 19 in relation to the reference numerals 1900s, and FIG. 27 in relation to the reference numerals 2700s. In first Example, if it is determined that there is no interference from the CPE in the process indicated by the reference numeral 2305, channel sharing is necessarily performed by using the DUSA, but, in second Example, in a case where an estimated value of channel use efficiency is increased by using the ODFC, the ODFC can be selected.

3-2. NC

Figure 30:
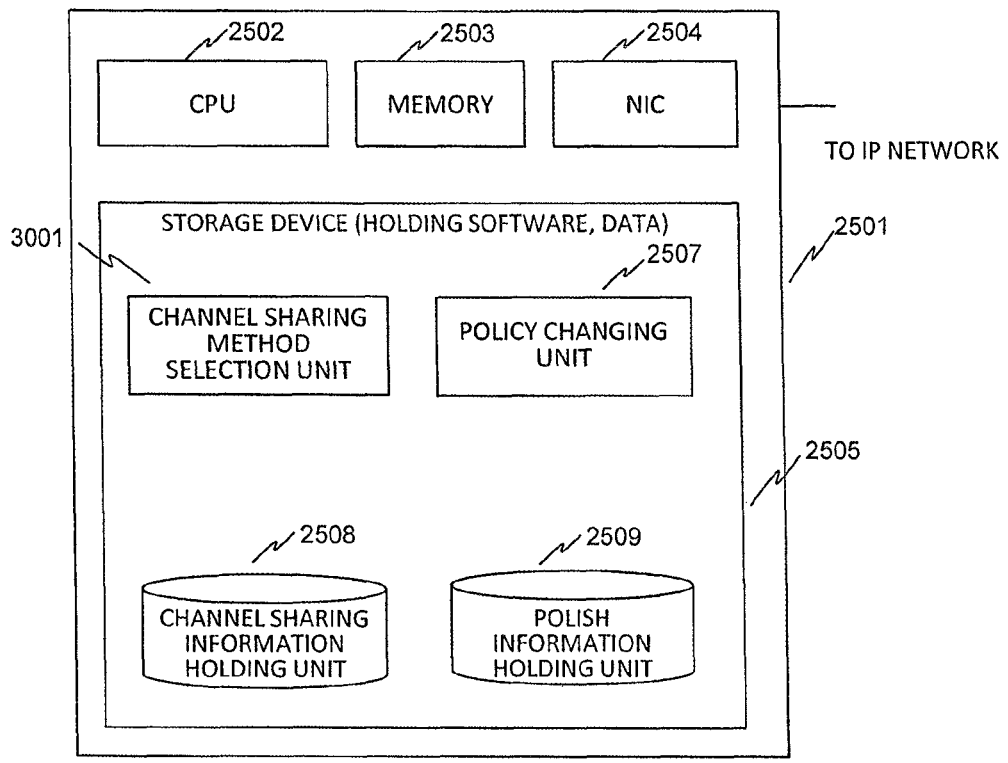
FIG. 30 is a diagram illustrating an NC configuration example according to second Example.

FIG. 30 is a configuration diagram of NC according to second Example. In second Example, a channel sharing method selection unit (3001) is provided instead of the DUSA split position calculation unit (2506) in the NC configuration example of first Example.

Figure 31:
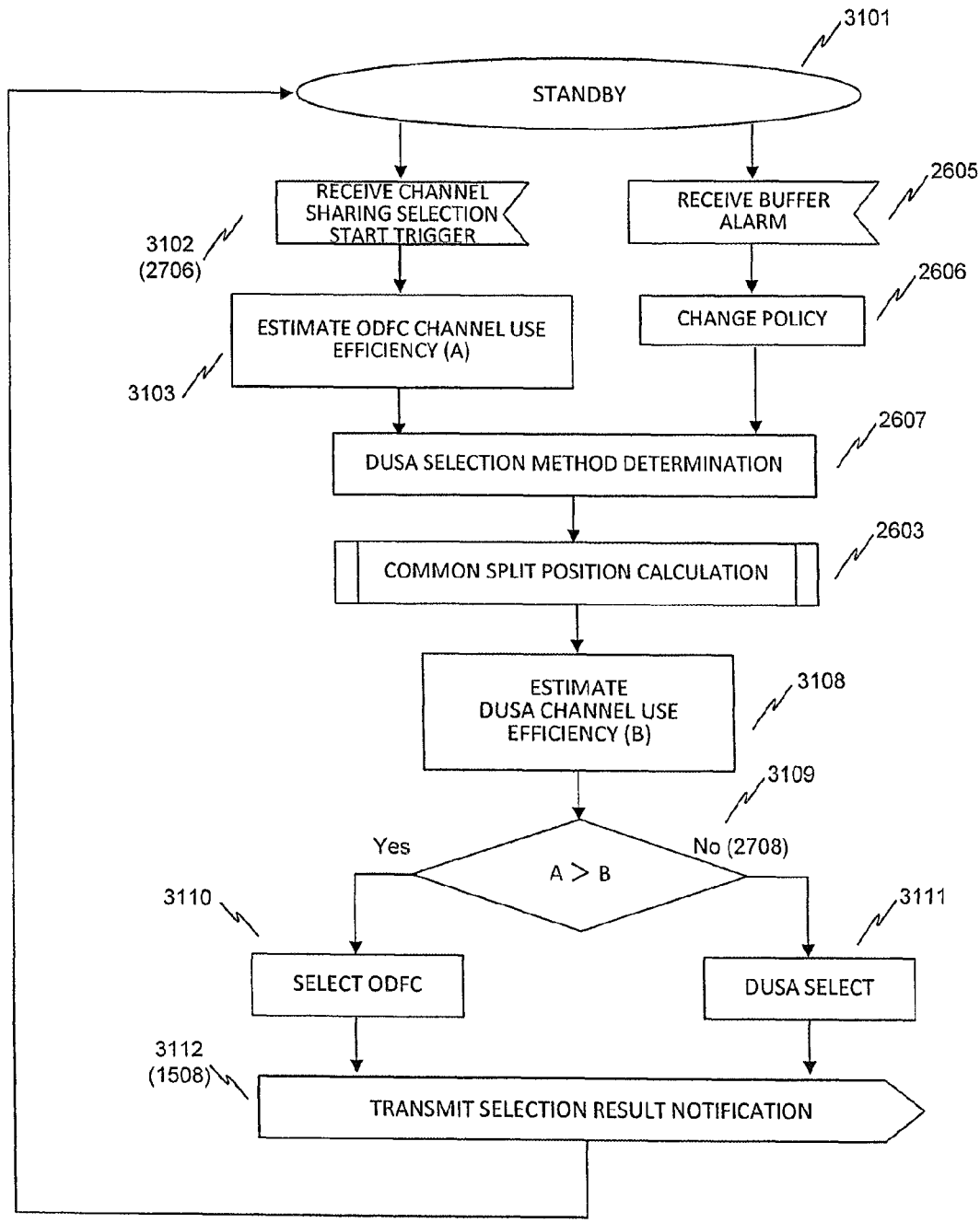
FIG. 31 is a flowchart illustrating that the NC selects a channel sharing method according to second Example.

FIG. 31 is a flowchart related to the channel sharing method selection unit (3001). In addition, refer to FIG. 27 in relation to the reference numerals 2700s. When a channel sharing selection start trigger is received (3102) during standby (3101), first, the NC (714) estimates (3103) OFDC channel use efficiency (A) in a case where the ODFC is performed. A calculation method of the OFDC estimated channel use efficiency (A) will be described later, and an estimated value is calculated assuming that all frames are uniformly distributed to BSs sharing a channel. DUSA selection method determination (2607) and common split position calculation (2603) are the same as those of first Example. Next, the NC estimates (3108) channel use efficiency (B) in a case where channel sharing is performed in the DUSA, compares (3109) the efficiencies, selects the ODFC (3110) if the ODFC estimated channel use efficiency (A) is higher, and selects the DUSA (3111) if the DUSA estimated channel use efficiency (B) is higher. Other operations are the same as those of first Example.

Here, a description will be made of calculation of channel use efficiency and an example of a comparison method. As represented in the following Equations 4 and 5, in a case of the ODFC, the number of frames (ODFC_FRAME_NUM_PER_BS) allocated to a single station is obtained which is a value by dividing the number of frames (ALL_FRAME_NUM_PER_SF) (sixteen in the 802.22 system) included in a super frame by the number of BSs (BS_NUM) sharing a channel, and an inverse number thereof is used as the ODFC estimated channel use efficiency (A).

$$\text{ODFC\_FRAME\_NUM\_PER\_BS} = \text{ALL\_FRAME\_NUM\_PER\_SF} / \text{BS\_NUM} \qquad \text{Equation 4}$$

$$\text{ODFC estimated channel use efficiency} = 1/\text{ODFC\_FRAME\_NUM\_PER\_BS} \qquad \text{Equation 5}$$

The estimated channel use efficiency (B) in a case of the DUSA has the same value as a value of the DUSA estimated channel use efficiency calculated in the common split position calculation (2603) of the split position calculation flowchart (FIG. 26) according to first Example.

As in Equation 6, the ODFC estimated channel use efficiency (A) is compared with the DUSA estimated channel use efficiency (B), a channel sharing method having higher channel use efficiency is selected, and thus communication with higher frequency channel use efficiency can be performed.

$$\text{IF ODFC estimated channel use efficiency}(A) > \text{DUSA estimated channel use efficiency}(B), \text{ then ODFC}, \text{ else DUSA} \qquad \text{Equation 6}$$

In addition, in first Example and second Example, an example intended for the 802.22 system has been described. However, any method may be used as long as the method corresponds to not the DUSA but the second sharing method, and any method may be used as long as the method corresponds to not the ODFC but the second sharing method.

4. Effects of Second Example

According to second Example, in addition to the above-described effects of first Example, the first sharing method in which interference is minimized through synchronization of a split position and the second sharing method in which interference is minimized by sharing a frame between a plurality of cells sharing a channel, and a method having higher frequency use efficiency can be used. Therefore, improvement in frequency channel use efficiency can be further expected than in a case where only the first sharing method is used.

D. Additional Statements

The present invention is not limited to the above embodiments, but includes various modified examples. For example, in the above-mentioned embodiments, in order to easily understand the present invention, the specific configurations are described. However, the present invention does not always provide all of the configurations described above. Also, a part of one configuration example can be replaced with another configuration example, and the configuration of one embodiment can be added with the configuration of another embodiment. Also, in a part of the respective configuration examples, another configuration can be added, deleted, or replaced.

Also, parts or all of the above-described respective configurations, functions, processors, processing means may be realized, for example, as an integrated circuit, or other hardware. Also, the above respective configurations and functions may be realized by allowing the processor to interpret and execute programs for realizing the respective functions. That is, the respective configurations and functions may be realized by software. The information on the program, table, and file for realizing the respective functions can be stored in a storage device such as a memory, a hard disc, or an SSD (solid state drive), or a storage medium such as an IC card, an SD card, or a DVD.

Also, the control lines and the information lines necessary for description are illustrated, and all of the control lines and the information lines necessary for products are not illustrated. In fact, it may be conceivable that most of the configurations are connected to each other.

In the above description, a standard such as IEEE802.22 has been described, but the present invention is not limited thereto and is applicable to an appropriate standard.

INDUSTRIAL APPLICABILITY

The present invention and the present example are useful as a communication control technique of a wireless communication system which provides a broadband wireless regional area network even in circumstances in which a frequency is tight.

REFERENCE SIGNS LIST

101 BASE STATION OF 802.22 SYSTEM POWERED ON
102 BS NETWORK INFORMATION ACQUISITION OF 802.22 SYSTEM
103 CHANNEL ACQUISITION OF 802.22 SYSTEM
104 CHANNEL ACQUISITION BRANCHING OF 802.22 SYSTEM
105 NORMAL MODE DATA SERVICE OF 802.22 SYSTEM
106 CHANNEL SHARING REQUEST FROM OUTSIDE OF 802.22 SYSTEM
107 INTERFERENCE SOURCE DETERMINATION BRANCHING OF 802.22 SYSTEM
108 ODFC OF 802.22 SYSTEM
109 ODFC CHANNEL SHARING MODE DATA SERVICE OF 802.22 SYSTEM
110 ADDITION/REDUCTION REQUEST FROM INSIDE OF 802.22 SYSTEM
201 SCHEMATIC DIAGRAM IN CASE OF ONLY INTERFERENCE BETWEEN BSs
202 SCHEMATIC DIAGRAM IN CASE OF GIVING INTERFERENCE TO CPE AS WELL
203 BASE STATION 1 (BS1)
204 BASE STATION 2 (BS2)
205 TERMINAL (CPE)
206 INTERFERENCE RANGE OF BS1
207 INTERFERENCE RANGE OF BS2
301 FRAME ALLOCATION IN NORMAL MODE
302 FRAME ALLOCATION IN SHARING MODE
401 SCHEMATIC DIAGRAM OF STATE IN WHICH ADJACENT BS GIVES INTERFERENCE TO US OF CPE
402 SCHEMATIC DIAGRAM OF STATE IN WHICH ADJACENT BS DOES NOT GIVE INTERFERENCE TO US OF CPE
501 FRAME STATE OF STATE IN WHICH ADJACENT BS GIVES INTERFERENCE TO US OF CPE
502 FRAME STATE OF STATE IN WHICH ADJACENT BS DOES NOT GIVE INTERFERENCE TO US OF CPE
601 FRAME STATE OF BS1 OF FIRST PROBLEM
602 FRAME STATE OF BS2 OF FIRST PROBLEM
603 FRAME STATE OF BS3 OF FIRST PROBLEM
701 BASE STATION 1 (BS1)
702 BASE STATION 2 (BS2)
703 TERMINAL 1 (CPE11) BELONGING TO BS1
704 TERMINAL 2 (CPE12) BELONGING TO BS1
705 TERMINAL 1 (CPE21) BELONGING TO BS2
706 TERMINAL 2 (CPE22) BELONGING TO BS2
707 COMMUNICABLE RANGE (CELL RANGE) OF BS1
708 COMMUNICABLE RANGE (CELL RANGE) OF BS2
711 DIGITAL TELEVISION BROADCASTING STATION
712 DIGITAL TELEVISION RECEIVER
713 WHITE SPACE DATABASE (WSDB)
714 NETWORK CONTROLLER (NC)
715 IP NETWORK
801 SUPER FRAME OF FRAMES BETWEEN BS AND CPE
802 FRAME OF FRAMES BETWEEN BS AND CPE
803 DOWNSTREAM SUBFRAME OF FRAMES BETWEEN BS AND CPE
804 UPSTREAM SUBFRAME OF FRAMES BETWEEN BS AND CPE
806 TRANSITION GAP OF FRAMES BETWEEN BS AND CPE
807 SPLIT POSITION OF UPSTREAM SUBFRAME AND DOWNSTREAM SUBFRAME
901 BASE STATION POWERED ON BY BS
902 PERIPHERAL INFORMATION ACQUISITION FROM BS
903 CHANNEL ACQUISITION BY BS
904 CHANNEL ACQUISITION SUCCESS STATE BY BS
905 NORMAL MODE DATA SERVICE BY BS
1001 DB INFORMATION ACQUISITION REQUEST FROM BS2 TO WSDB
1002 DB INFORMATION ACQUISITION NOTIFICATION FROM WSDB TO BS2
1003 PERIPHERAL BS/CPE INFORMATION FROM BS1
1004 PERIPHERAL BS/CPE INFORMATION FROM CPE11
1005 CPE INFORMATION FROM CPE21 TO BS2
1006 CHANNEL SET UPDATE IN BS2
1007 BS INFORMATION UPDATE IN BS2
1101 BS INFORMATION TABLE
1201 CHANNEL SET INFORMATION TABLE
1303 CHANNEL ACQUISITION FAILURE STATE IN BS2
1304 INTERFERENCE DETERMINATION IN BS2
1305 CPE INTERFERENCE PRESENT STATE IN BS2
1306 ODFC PROCESS IN BS2
1307 ODFC PROCESS IN BS1
1309 ODFC CHANNEL SHARING DATA SERVICE IN BS2
1310 ODFC CHANNEL SHARING DATA SERVICE IN BS1
1401 FC REQUEST FROM BS2 TO BS3
1402 FRAME CONTENTION IN BS3
1403 FC REQUEST FROM BS3
1405 FC NOTIFICATION FROM BS2
1406 FC OPENING NOTIFICATION FROM BS3
1503 DUSA SELECTION METHOD DETERMINATION IN NC
1505 CPE INTERFERENCE ABSENT STATE IN BS2
1506 DUSA START TRIGGER FROM BS2 TO NC
1507 COMMON SPLIT POSITION CALCULATION IN NC
1508 SELECTION RESULT NOTIFICATION FROM NC TO BS2
1509 SELECTION RESULT NOTIFICATION FROM NC TO BS1
1510 DUSA RESULT REFLECTING PROCESS IN BS1

1511 DUSA RESULT REFLECTING PROCESS IN BS2
1512 DUSA CHANNEL SHARING DATA SERVICE IN BS1
1513 DUSA CHANNEL SHARING DATA SERVICE IN BS2
1601 TRANSMISSION SOURCE IP INFORMATION OF FRAME BETWEEN BS AND NC
1602 TRANSMISSION DESTINATION IP INFORMATION OF FRAME BETWEEN BS AND NC
1603 BS-ID INFORMATION OF FRAME BETWEEN BS AND NC
1604 TRIGGER OR NOTIFICATION IDENTIFIER OF FRAME BETWEEN BS AND NC
1605 USE CHANNEL INFORMATION OF FRAME BETWEEN BS AND NC
1607 CPE INTERFERENCE PRESENCE OR ABSENCE IDENTIFIER OF FRAME BETWEEN BS AND NC
1608 SPLIT INFORMATION OF FRAME BETWEEN BS AND NC
1609 PRESENT SPLIT POSITION INFORMATION OF FRAME BETWEEN BS AND NC
1610 REQUESTED SPLIT POSITION INFORMATION OF FRAME BETWEEN BS AND NC
1611 DUSA DETERMINED SPLIT POSITION INFORMATION OF FRAME BETWEEN BS AND NC
1700 CHANNEL SHARING INFORMATION TABLE
1701 BS NAME OF CHANNEL SHARING INFORMATION TABLE
1702 BS-ID OF CHANNEL SHARING INFORMATION TABLE
1703 USE FREQUENCY CHANNEL NUMBER OF CHANNEL SHARING INFORMATION TABLE
1704 CPE INTERFERENCE PRESENCE OR ABSENCE INFORMATION OF CHANNEL SHARING INFORMATION TABLE
1705 PRESENT SPLIT POSITION INFORMATION OF CHANNEL SHARING INFORMATION TABLE
1706 REQUESTED SPLIT POSITION INFORMATION OF CHANNEL SHARING INFORMATION TABLE
1707 SHARING STATE INFORMATION OF CHANNEL SHARING INFORMATION TABLE
1708 SELECTION METHOD (POLICY NUMBER) INFORMATION OF CHANNEL SHARING INFORMATION TABLE
1709 DUSA DETERMINED SPLIT POSITION INFORMATION OF CHANNEL SHARING INFORMATION TABLE
1801 BS INFORMATION NOTIFICATION FROM BS2 TO NC
1802 BS INFORMATION NOTIFICATION FROM BS1 TO NC
1803 CHANNEL SHARING INFORMATION UPDATE IN NC
1901 ADDITION/REDUCTION REQUEST FROM CPE11 TO BS1
1903 CHANNEL SHARING REQUEST FROM BS3 TO BS1
2003 BUFFER STATE MONITORING IN BS1
2004 BUFFER MONITORING STATE IN BS2
2005 BUFFER MONITORING STATE IN CPE11
2006 BUFFER STATE ABNORMAL STATE (EXCEEDING THRESHOLD VALUE) IN BS2
2007 BUFFER ALARM FROM BS2 TO NC
2008 POLICY CHANGE IN NC
2101 DUSA SELECTION METHOD DETERMINATION TABLE
2201 BS
2202 WRAN TRANSMISSION AND RECEPTION UNIT OF BS
2203 WRAN TRANSMISSION AND RECEPTION ANTENNA OF BS
2204 CPU OF BS
2205 MEMORY OF BS
2206 NIC OF BS
2207 SYNCHRONIZATION UNIT (GPS) OF BS
2208 GPS ANTENNA OF BS
2209 CONTROL UNIT OF BS
2210 TRANSMISSION AND RECEPTION CONTROL UNIT OF BS
2211 CHANNEL SHARING CONTROL UNIT OF BS
2212 DUSA START TRIGGER TRANSMISSION UNIT OF BS
2213 TRANSMISSION DATA BUFFER MONITORING UNIT OF BS
2214 BS INFORMATION HOLDING UNIT OF BS
2215 CHANNEL SET HOLDING UNIT OF BS
2300 CHANGING POINT FROM 802.22
2301 BS ACTIVATION PROCESS OF CHANNEL SHARING FLOW
2302 CHANNEL ACQUISITION OF CHANNEL SHARING FLOW
2303 CHANNEL ACQUISITION SUCCESS/FAILURE BRANCHING OF CHANNEL SHARING FLOW
2304 NORMAL MODE DATA SERVICE OF CHANNEL SHARING FLOW
2305 CPE INTERFERENCE PRESENCE OR ABSENCE BRANCHING OF CHANNEL SHARING FLOW
2306 ODFC OF CHANNEL SHARING FLOW
2307 ODFC SHARING MODE DATA SERVICE OF CHANNEL SHARING FLOW
2308 DUSA START TRIGGER TRANSMISSION OF CHANNEL SHARING FLOW
2309 SELECTION RESULT NOTIFICATION RECEPTION OF CHANNEL SHARING FLOW
2310 DUSA SHARING MODE DATA SERVICE OF CHANNEL SHARING FLOW
2311 ADDITION/REDUCTION REQUEST FROM INSIDE
2312 FREQUENCY CHANNEL SHARING REQUEST FROM OUTSIDE
2401 CHANNEL SHARING START RECEPTION OF DUSA SELECTION METHOD UPDATE FLOWCHART
2402 TRANSMISSION BUFFER MONITORING STATE OF DUSA SELECTION METHOD UPDATE FLOWCHART
2403 BRANCHING BASED ON QUEUE LENGTH OF DUSA SELECTION METHOD UPDATE FLOWCHART
2404 BUFFER ALARM TRANSMISSION OF DUSA SELECTION METHOD UPDATE FLOWCHART
2405 CHANNEL SHARING END OF DUSA SELECTION METHOD UPDATE FLOWCHART
2406 BUFFER MONITORING END OF DUSA SELECTION METHOD UPDATE FLOWCHART
2501 NC
2502 CPU OF NC
2503 MEMORY OF NC
2504 NIC OF NC
2505 CONTROL UNIT OF NC
2506 DUSA SPLIT POSITION CALCULATION UNIT OF NC
2507 POLICY CHANGING UNIT OF NC
2508 CHANNEL SHARING INFORMATION HOLDING UNIT OF NC

2509 POLICY INFORMATION HOLDING UNIT OF NC
2601 NC STANDBY STATE OF SPLIT POSITION CALCULATION FLOWCHART
2602 DUSA START TRIGGER RECEPTION OF SPLIT POSITION CALCULATION FLOWCHART
2603 COMMON SPLIT POSITION CALCULATION OF SPLIT POSITION CALCULATION FLOWCHART
2604 SELECTION RESULT NOTIFICATION TRANSMISSION OF SPLIT POSITION CALCULATION FLOWCHART
2605 BUFFER ALARM RECEPTION OF SPLIT POSITION CALCULATION FLOWCHART
2606 POLICY CHANGE OF SPLIT POSITION CALCULATION FLOWCHART
2607 DUSA SELECTION METHOD DETERMINATION OF SPLIT POSITION CALCULATION FLOWCHART
2706 CHANNEL SHARING METHOD SELECTION START TRIGGER FROM BS2 TO NC
2707 CHANNEL SHARING METHOD SELECTION IN NC
2708 ODFC SELECTION STATE IN NC
2801 CHANNEL SHARING METHOD SELECTION START TRIGGER TRANSMISSION UNIT OF BS OF SECOND EXAMPLE
2802 CHANNEL SHARING CONTROL UNIT OF BS OF SECOND EXAMPLE
2900 CHANGING POINT FROM 802.22 OF CHANNEL SHARING FLOWCHART OF SECOND EXAMPLE
2901 CHANNEL SHARING METHOD SELECTION START TRIGGER TRANSMISSION OF CHANNEL SHARING FLOWCHART OF SECOND EXAMPLE
2902 SELECTION RESULT NOTIFICATION RECEPTION OF CHANNEL SHARING FLOWCHART OF SECOND EXAMPLE
2903 SELECTION METHOD BRANCHING OF CHANNEL SHARING FLOWCHART OF SECOND EXAMPLE
3001 CHANNEL SHARING METHOD SELECTION UNIT OF NC OF Second Example
3101 NC STANDBY STATE OF CHANNEL SHARING METHOD SELECTION FLOWCHART OF SECOND EXAMPLE
3102 CHANNEL SHARING METHOD SELECTION START TRIGGER RECEPTION OF CHANNEL SHARING METHOD SELECTION FLOWCHART OF SECOND EXAMPLE
3103 ODFC CHANNEL USE EFFICIENCY ESTIMATION OF CHANNEL SHARING METHOD SELECTION FLOWCHART OF SECOND EXAMPLE
3108 DUSA CHANNEL USE EFFICIENCY ESTIMATION OF CHANNEL SHARING METHOD SELECTION FLOWCHART OF SECOND EXAMPLE
3109 CHANNEL USE EFFICIENCY BRANCHING OF CHANNEL SHARING METHOD SELECTION FLOWCHART OF SECOND EXAMPLE
3110 ODFC SELECTION OF CHANNEL SHARING METHOD SELECTION FLOWCHART OF SECOND EXAMPLE
3111 DUSA SELECTION OF CHANNEL SHARING METHOD SELECTION FLOWCHART OF SECOND EXAMPLE
3112 SELECTION RESULT NOTIFICATION TRANSMISSION OF CHANNEL SHARING METHOD SELECTION FLOWCHART OF SECOND EXAMPLE

The invention claimed is:

1. A wireless communication system comprising:
one or a plurality of base stations (BSs) that perform a data service in a normal mode in which a channel is not shared between adjacent cells, or in a first sharing mode in which a split position of a downstream subframe and an upstream subframe of each frame in which a frequency channel is shared is used in common, and the downstream subframe and the upstream subframe are alternately disposed on a time axis so that the base stations do not give interference to each other; and
a network controller (NC), wherein
the NC includes
    a channel sharing information table that stores channel sharing information including BS identification information, a use channel indicating a currently used channel, a present split position, a requested split position, and a common split position, in relation to the one or the plurality of BSs under the competence of the NC; and
    a processing unit that determines the common split position of the frame,
wherein
the BS transmits a base station information including BS identification information, the use channel, the present split position, and the requested split position,
the NC receives the base station information and stores the base station information in the channel sharing information table,
when the BS selects a usable channel to be acquired, in a case where the BS determines that channel acquisition fails due to the selected usable channel being shared by an adjacent cell, the BS determines whether or not a wireless terminal belonging to another BS adjacent thereto is located at a position where interference is given to the BS, and in a case where there is no interference from the wireless terminal, the BS transmits a channel sharing start trigger including BS identification information and the use channel to the NC,
the NC receives the channel sharing start trigger from the BS, and the processing unit determines a common split position candidate at which first estimated channel use efficiency is the maximum as common split position information and sends the common split position information to the BS, wherein
the first estimated channel use efficiency is a value which becomes worse as the common split position candidate gets away from the requested split position from one of the plurality of BSs, and
the BS receives the common split position information determined by the NC, adjusts a split position according to the common split position information, and performs a data service by using channel sharing based on the first sharing mode.

2. The wireless communication system according to claim 1, wherein
when the BS selects the usable channel to be acquired, in a case where the channel acquisition is successful due to the selected usable channel not being shared by the adjacent cell, the BS performs the data service in the normal mode.

3. The wireless communication system according to claim 1, wherein
the BS performs the data service by selecting any one of the normal mode, the first sharing mode, and a second sharing mode in which a plurality of shared frames are used between the the plurality of BSs so that communication times do not overlap each other, and the BS performs the data service in the second sharing mode in a case where there is interference from the wireless terminal.

4. The wireless communication system according to claim 1, wherein the NC receives a BS information notification including BS identification information, the use channel, the present split position, the requested split position, and a sharing state, from each of the BSs, and the processing unit updates the channel sharing information table on the basis of the BS information notification.

5. The wireless communication system according to claim 1, wherein the BS has a channel set information table that includes any two or more of the use channel, a backup channel set which is used when the use channel cannot be used, a candidate channel set, and a cell priority channel set which includes a channel which cannot be used unless the channel is shared with an adjacent cell, and the BS refers to the channel set information table, selects a channel to be used at random or in a predefined order from the plurality of the channel sets, determines that channel acquisition is successful in a case where a channel which is not shared with an adjacent cell is selected, and determines that the channel acquisition fails in a case where a channel which is shared with the adjacent cell is selected.

6. The wireless communication system according to claim 1, wherein the processing unit refers to the channel sharing information table, and calculates one or a plurality of common split position candidates according to preset any one of a common split position selection method based on a split position which is a mean value between cells using the use channel, a common split position selection method based on a split position at which a downstream subframe is the maximum, a common split position selection method based on a split position at which an upstream subframe is the maximum, and a common split position selection method based on a predefined split position, or the plurality of common split position selection methods, on the basis of the present split position and/or the requested split position for one or a plurality of BSs having one or a plurality of BS identification information and using the use channel defined by the channel sharing start trigger.

7. The wireless communication system according to claim 6, wherein the processing unit of the NC calculates the first estimated channel use efficiency as an inverse number of a value which is obtained by dividing a split position of a base station in which the requested split position is the minimum among base stations sharing a frequency channel in the first sharing mode, by an upstream length or an upstream subframe length which is sent per frame and is calculated by subtracting a split position calculated for each policy from a frame length, and determines a common split position candidate based on a common split position selection method by the maximum first estimated channel use efficiency among the plurality of calculated first estimated channel use efficiencies, as the common split position information.

8. The wireless communication system according to claim 6, wherein when the NC receives a buffer alarm from the BS, the processing unit of the NC changes predefined policy, determines the common split position selection method corresponding to the changed policy, and calculates a common split position in the determined common split position selection method.

9. The wireless communication system according to claim 1, wherein the BS performs the data service by selecting any one of the normal mode, the first sharing mode, and a second sharing mode in which a plurality of shared frames are used between the respective base stations so that communication times do not overlap each other, the NC receives the channel sharing start trigger, the processing unit compares first estimated channel use efficiency in the first sharing mode with second estimated channel use efficiency in the second sharing mode, and performs a channel sharing method selection process of selecting a sharing mode with higher estimated channel use efficiency, in a case where the first sharing mode is selected in the channel sharing method selection process, the processing unit of the NC determines a common split position which is used in common by the BS sharing a channel, and transmits a selection result notification including the common split position information to the BS, in a case where the second sharing mode is selected in the channel sharing method selection process, the processing unit of the NC does not perform calculation of a common split position and transmission of the common split position information, and transmits a selection result notification indicating that the second sharing mode is selected to the BS, and the BS receives the selection result notification from the NC, and performs a data service in any one of the sharing mode based on the received selection result notification.

10. The wireless communication system according to claim 9, wherein the processing unit of the NC calculates the second estimated channel use efficiency assuming that each frame is uniformly distributed to the one or the plurality of BSs sharing a channel in a case where the data service is performed in the second sharing mode, the processing unit calculates a common split position in the first sharing mode, and calculates the first estimated channel use efficiency in a case where channel sharing is performed in the first sharing mode, and the processing unit compares the second estimated channel use efficiency with the first estimated channel use efficiency and selects a sharing mode with higher estimated channel use efficiency.

11. The wireless communication system according to claim 9, wherein the processing unit of the NC calculates, as the second estimated channel use efficiency, an inverse number of the number of frames, allocated to a single station, which is a value obtained by dividing the number of frames included in a super channel by the number of BSs sharing a channel.

12. The wireless communication system according to claim 1, wherein the BS transmits the channel sharing start trigger to the NC in a case where the BS and a BS adjacent to the BS are located at a position where the BS and the BS adjacent to the BS give interference to each other, the BS cannot use frequency channels other than frequency channels used by all adjacent BSs, and the BS does not receive interference from a wireless terminal which performs communication with a BS located to be adjacent to the BS.

13. The wireless communication system according to claim 1, wherein
the processing unit of the NC
calculates a first estimated number of frames concerning transmission of an upstream subframe which are originally to be sent via one frame on the basis of a split position of the BS at which an upstream subframe is the maximum of the determined common split position and a split position requested by a plurality of BSs sharing a frequency channel, and
compares the first estimated number of frames with a second estimated number of frames which is obtained by dividing the number of all frames of the shared frequency channel by the number of plural BSs sharing the frequency channel, and
the common split position is used in a case where the first estimated number of frames is smaller, and the plurality of BSs share the frequency channel in a time division manner in a case where the second number of frames is smaller.

14. The wireless communication system according to claim 1, wherein
a BS sharing a frequency channel, and/or a wireless terminal belonging to the BS monitors a transmission data buffer amount of the BS and/or the wireless terminal,
the BS transmits a buffer alarm to the NC in a case where a buffer amount of the base station exceeds a threshold value, and/or the wireless terminal transmits a buffer alarm to the network controller via the BS in a case where a buffer amount of the wireless terminal exceeds a threshold value, and
the NC selects a common split position again from among the split position candidates when the buffer alarm is received.

15. A frequency channel sharing method in a wireless communication system, the wireless communication system comprising:
one or a plurality of base stations (BSs) that perform a data service in a normal mode in which a channel is not shared between adjacent cells, or in a first sharing mode in which a split position of a downstream subframe and an upstream subframe of each frame in which a frequency channel is shared is used in common, and the downstream subframe and the upstream subframe are alternately disposed on a time axis so that the base stations do not give interference to each other; and
a network controller (NC), wherein
the NC includes
a channel sharing information table that stores channel sharing information including BS identification information, a use channel, a present split position, a requested split position, and a common split position, in relation to the one or the plurality of BSs under the competence of the NC; and
a processing unit that determines the common split position of the frame,
wherein
the BS transmits a base station information including BS identification information, the use channel, the present split position, and the requested split position,
the NC receives the base station information and stores the base station information in the channel sharing information table,
when the BS selects a usable channel to be acquired, in a case where the BS determines that channel acquisition fails due to the selected usable channel being shared by an adjacent cell, the BS determines whether or not a wireless terminal belonging to another BS adjacent thereto is located at a position where interference is given to the BS, and in a case where there is no interference from the wireless terminal, the BS transmits a channel sharing start trigger including BS identification information and the use channel to the NC,
the NC receives the channel sharing start trigger from the BS, and the processing unit determines a common split position candidate at which first estimated channel use efficiency is the maximum as common split position information and sends the common split position information to the BS, wherein
the first estimated channel use efficiency is a value which becomes worse as the common split position candidate gets away from the requested split position from one of the plurality of BSs, and
the BS receives the common split position information determined by the NC, adjusts a split position according to the common split position information, and performs a data service by using channel sharing based on the first sharing mode.

16. A network controller device in a wireless communication system, the wireless communication system comprising:
one or a plurality of base stations (BSs) that perform a data service in a normal mode in which a channel is not shared between adjacent cells, or in a first sharing mode in which a split position of a downstream subframe and an upstream subframe of each frame in which a frequency channel is shared is used in common, and the downstream subframe and the upstream subframe are alternately disposed on a time axis so that the base stations do not give interference to each other; and
the network controller device (NC), wherein
the NC includes
a channel sharing information table that stores channel sharing information including BS identification information, a use channel, a present split position, a requested split position, and a common split position, in relation to the one or the plurality of BSs under the competence of the NC; and
a processing unit that determines the common split position of the frame,
wherein
the NC, from the BS, receives a base station information including BS identification information, the use channel, the present split position, and the requested split position,
the NC stores the base station information in the channel sharing information table,
when the BS selects a usable channel to be acquired, in a case where the BS determines that channel acquisition fails due to the selected usable channel being shared by an adjacent cell, the BS determines whether or not a wireless terminal belonging to another BS adjacent thereto is located at a position where interference is given to the BS, and in a case where there is no interference from the wireless terminal, the NC, from the BS, receives a channel sharing start trigger including BS identification information and the use channel,
the processing unit determines a common split position candidate at which first estimated channel use efficiency is the maximum as common split position information and sends the common split position information to the BS wherein, the first estimated channel use efficiency is a value which becomes worse as the common split position candidate gets away from the requested split position from one of the plurality of BSs, and the NC makes the BS receive the common split position information determined by the NC, adjust a split position according to the common split position information, and perform a data service by using channel sharing based on the first sharing mode.

* * * * *